United States Patent
Ng et al.

(10) Patent No.: US 9,990,621 B1
(45) Date of Patent: Jun. 5, 2018

(54) MERCHANT APPLICATION PROGRAMMING INTERFACE FOR SPLITTING BILLS

(71) Applicant: Square, Inc., San Francisco, CA (US)

(72) Inventors: Aaron Y. Ng, San Francisco, CA (US); Ayokunle Omojola, San Francisco, CA (US); Jesse Wilson, Waterloo (CA)

(73) Assignee: Square, Inc., San Francisco, CA (US)

( * ) Notice: Subject to any disclaimer, the term of this patent is extended or adjusted under 35 U.S.C. 154(b) by 460 days.

(21) Appl. No.: 14/664,766

(22) Filed: Mar. 20, 2015

(51) Int. Cl.
| | |
|---|---|
| *G06Q 20/22* | (2012.01) |
| *G06Q 20/20* | (2012.01) |
| *G06Q 20/10* | (2012.01) |
| *G06Q 20/42* | (2012.01) |
| *G06Q 20/32* | (2012.01) |

(52) U.S. Cl.
CPC ......... *G06Q 20/29* (2013.01); *G06Q 20/102* (2013.01); *G06Q 20/202* (2013.01); *G06Q 20/3223* (2013.01); *G06Q 20/42* (2013.01)

(58) Field of Classification Search
None
See application file for complete search history.

(56) References Cited

U.S. PATENT DOCUMENTS

| | | | |
|---|---|---|---|
| 5,844,572 A | 12/1998 | Schott | |
| 8,020,763 B1 | 9/2011 | Kowalchyk et al. | |
| 9,665,858 B1 * | 5/2017 | Kumar | G06Q 20/102 |

| | | |
|---|---|---|
| 2003/0115095 A1 | 6/2003 | Yamauchi |
| 2004/0248548 A1 | 12/2004 | Niwa et al. |
| 2006/0282660 A1 | 12/2006 | Varghese et al. |
| 2010/0082481 A1 | 4/2010 | Lin et al. |
| 2010/0280860 A1 | 11/2010 | Iskold et al. |
| 2011/0145049 A1 | 6/2011 | Hertel et al. |
| 2011/0178883 A1 | 7/2011 | Granbery et al. |
| 2011/0238517 A1 | 9/2011 | Ramalingam et al. |
| 2011/0251892 A1 | 10/2011 | Laracey |
| 2011/0283188 A1 | 11/2011 | Farrenkopf et al. |
| 2011/0307282 A1 | 12/2011 | Camp et al. |
| 2011/0313871 A1 | 12/2011 | Greenwood |
| 2012/0130903 A1 | 5/2012 | Dorsey et al. |
| 2012/0166332 A1 | 6/2012 | Naaman |
| 2012/0265676 A1 | 10/2012 | Gould et al. |
| 2013/0132274 A1 | 5/2013 | Henderson et al. |
| 2013/0246220 A1 | 9/2013 | Hammad et al. |
| 2013/0290040 A1 | 10/2013 | Perry et al. |

(Continued)

OTHER PUBLICATIONS

Non-Final Office Action dated Nov. 17, 2015, for U.S. Appl. No. 13/925,683, of Clark, C., et al., filed Jun. 24, 2013.

(Continued)

*Primary Examiner* — Florian M Zeender
*Assistant Examiner* — Denisse Y Ortiz Roman
(74) *Attorney, Agent, or Firm* — Baker Botts L.L.P.

(57) ABSTRACT

Split bill payment technology enabled by an application programming interface (API) is disclosed. In some embodiments, API integration between a merchant application or system and a payment application or payment service system enables the merchant application or system to send requests for split bill payments to the payment service system. In response, the payment service system can collect from each bill payer identified in a request, the bill payer's share of a bill and transfer the collected amounts to the merchant.

20 Claims, 13 Drawing Sheets

(56) References Cited

U.S. PATENT DOCUMENTS

| | | | |
|---|---|---|---|
| 2013/0317893 A1 | 11/2013 | Nelson et al. | |
| 2014/0156517 A1 | 6/2014 | Argue et al. | |
| 2015/0287006 A1* | 10/2015 | Hunter | G06Q 20/145 705/21 |

OTHER PUBLICATIONS

Advisory Action dated Dec. 14, 2015, for U.S. Appl. No. 13/649,603, of Kumar, A., filed Oct. 11, 2012.
Final Office Action dated May 19, 2016, for U.S. Appl. No. 13/925,683, of Clark, C., et al., filed Jun. 24, 2013.
Final Office Action dated Jul. 21, 2016, for U.S. Appl. No. 13/649,603, of Kumar, A., filed Oct. 11, 2012.
Non-Final Office Action dated Oct. 18, 2016, for U.S. Appl. No. 13/925,683, of Clark, C., et al., filed Jun. 24, 2013.
Aotice of Allowance dated Jan. 26, 2017, for U.S. Appl. No. 13/649,603, of Kumar, A., filed Oct. 11, 2012.
Non-Final Office Action dated Feb. 10, 2017, for U.S. Appl. No. 14/569,451, of Abrams, Z.C., et al., filed Dec. 12, 2014.
"Billr: Bill Splitting at the Table," Billr, iTunes Preview, Retrieved from the internet URL: https://itunes.apple.com/us/app/billr-bill-splitting-attable/id501889312?ls=l&mt=8, on Nov. 4, 2014, pp. 1-2.
"Divvy on the App Store on iTunes," iTunes, Helix Interactive, Retrieved from the internet URL: https://itunes.apple.com/us/ap12/divvy/id560503890?ls=1 &mt=8, on Nov. 4, 2014, pp. 1-2.
Dodd, A., "dapShare Mobile—Andriod Apps on Google Play," dated Nov. 23, 2011, Retrieved from the internet URL: https://play.google.com/store/apps/details?id=com.dapshare&hl=en, on Nov. 4, 2014, pp. 1-2.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
"Sharing bills & expenses?," WeSplit.It., Retrieved from the Internet URL : https://wesplit.it/, on Nov. 4, 2014, pp. 1-2.
"Split bills, share rent & expenses for your sharehouse or holiday, The best way to split bills," dapShare, Retrieved from the Internet: URL<http://dapshare.com/, on Nov. 4, 2014, pp. 1-2.
"Split expenses with friends," Splitwise, Retrieved from the Internet URL: https://www.splitwise.com/, on Nov. 4, 2014, pp. 1-2.
"Splitabill," Funkbit AS, iTunes Preview, dated Oct. 15, 2012, Retrieved from the Internet URL: https://itunes.apple.com/us/app/splitabill/id485048203, on Nov. 4, 2014, pp. 1-2.
"splitabill.com: Take a tour," Splitabill, Retrieved from the Internet URL: https://splitabill.com/tour/, on Nov. 4, 2014, pp. 1-2.
"Splitwise," Google Play, dated Oct. 15, 2014, Retrieved from the Internet URL: https://play.google.com/store/aoos/details?id=com.Splitwise.SplitwiseMobile, on Nov. 4, 2014, pp. 1-2.
"The quickest way to split a bill and calculate the tip at restaurants and bars," Billr.me, Retrieved from the Internet URL: http://billr.me/, on Oct. 29, 2015, pp. 1-4.
"What is Divvy?," Divvy That Up, dated Sep. 17, 2013, Retrieved from the Internet URL: http://www.divvythatup.com/, on Nov. 4, 2014, pp. 1-5.
Non-Final Office Action dated Jun. 11, 2013, for U.S. Appl. No. 13/649,603, of Kumar, A., filed Oct. 11, 2012.
Final Office Action dated Dec. 5, 2013, for U.S. Appl. No. 13/649,603, of Kumar, A., filed Oct. 11, 2012.
Non-Final Office Action dated Oct. 14, 2014, for U.S. Appl. No. 13/925,683, of Clark, C., et al., filed Jun. 24, 2013.
Non-Final Office Action dated Jan. 28, 2015, for U.S. Appl. No. 13/649,603, of Kumar, A., filed Oct. 11, 2012.
Final Office Action dated May 13, 2015, for U.S. Appl. No. 13/925,683, of Clark, C., et al., filed Jun. 24, 2013.
Non-Final Office Action dated Aug. 26, 2015, for U.S. Appl. No. 14/140,212, of Chin, A., et al., filed Dec. 24, 2013.
Final Office Action dated Oct. 16, 2015, for U.S. Appl. No. 13/649,603, of Kumar, A., filed Oct. 11, 2012.
U.S. Appl. No. 14/664,781 of Ng, A. Y., et al., filed Mar. 20, 2015.
Non-Final Office Action dated Feb. 25, 2016, for U.S. Appl. No. 13/649,603, of Kumar, A., filed Oct. 11, 2012.
Final Office Action dated May 18, 2017, for U.S. Appl. No. 13/925,683, of Clark, C., et al., filed Jun. 24, 2013.

* cited by examiner

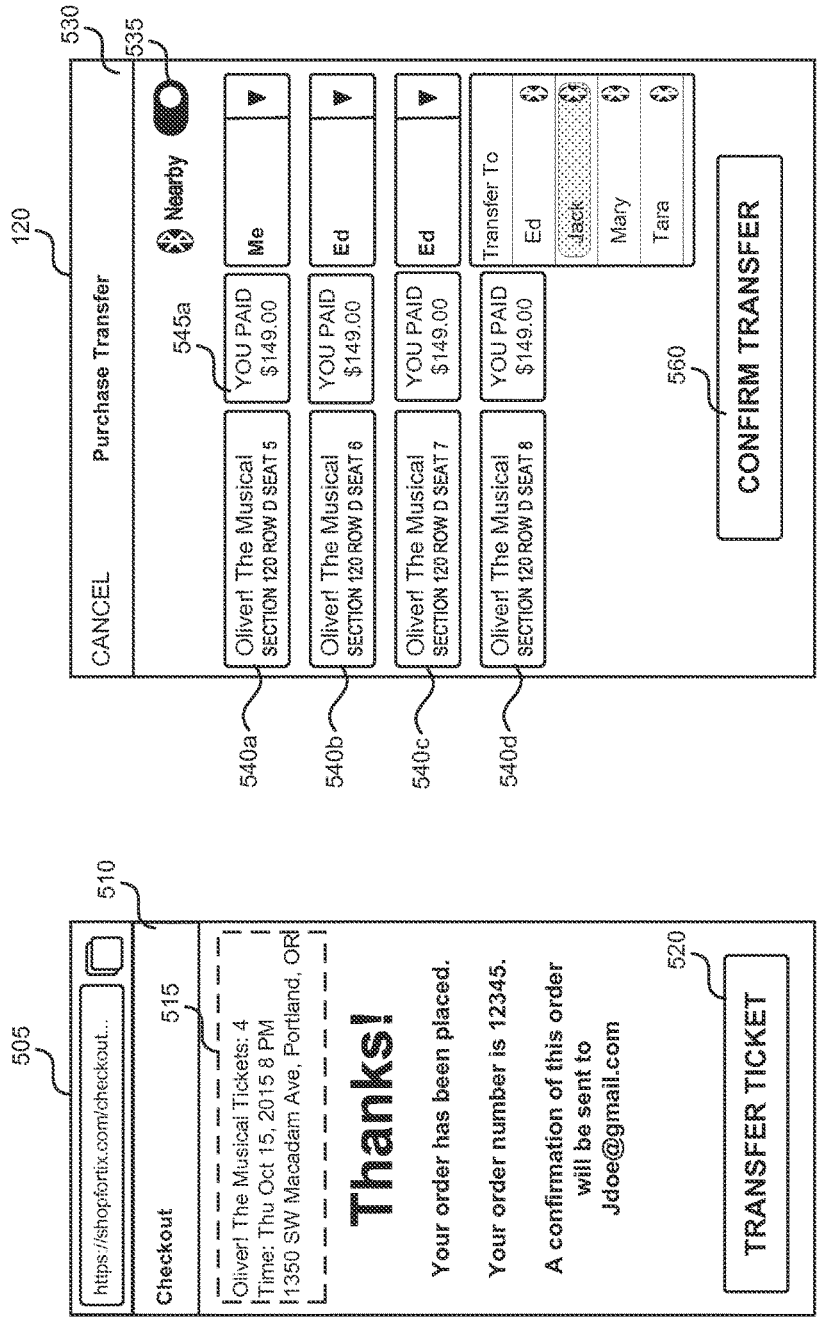

MERCHANT APPLICATION PROGRAMMING INTERFACE FOR SPLITTING BILLS

BACKGROUND

In a conventional transaction involving a merchant and a customer, the merchant generally provides a statement of charges (a "bill" or an "invoice") for an amount of money owed for goods or services the customer has acquired or consumed. In some situations, a group of customers may share the goods or services. For example, consider a group of customers seated at the same table in a restaurant. Each customer may want to pay for the items he or she ordered, or the customers may want to split the bill equally among themselves. Typically, in either case, each customer ends up providing his or her debit or credit card to the merchant, so that the merchant can swipe each card to charge an appropriate amount to each customer. However, the merchant can swipe only one card at a time on a card reader, and after each swipe, the merchant needs to wait for authorization from the card payment network. Thus, splitting the bill in this manner is time consuming and burdensome for the merchant.

Some existing applications have attempted provide a solution for bill splitting by shifting the burden from the merchant to the customers themselves. However, many of these applications merely enable each customer in a group to select the items he or she ordered from their mobile devices (e.g., smartphones), and calculate an amount that he or she is responsible for. The merchant still needs to swipe the customers' cards to charge the amounts the customers have determined using the applications. Thus, the existing solutions have not been successful on making bill splitting less time consuming and burdensome for the merchants.

BRIEF DESCRIPTION OF THE DRAWINGS

Application programming interface (API) based technologies for integrating merchant applications and/or systems with a payment service system to enable split bill payment and purchase transfer introduced here may be better understood by referring to the following Detailed Description in conjunction with the accompanying drawings, in which like reference numerals indicate identical or functionally similar elements.

FIG. 5A is a user interface diagram illustrating an example checkout interface of a merchant including an option to transfer purchase units.

FIG. 5B is a user interface diagram illustrating an example interface of a payment application associated with a payment service system for transfer of purchase units to another.

DETAILED DESCRIPTION

Figure 1:
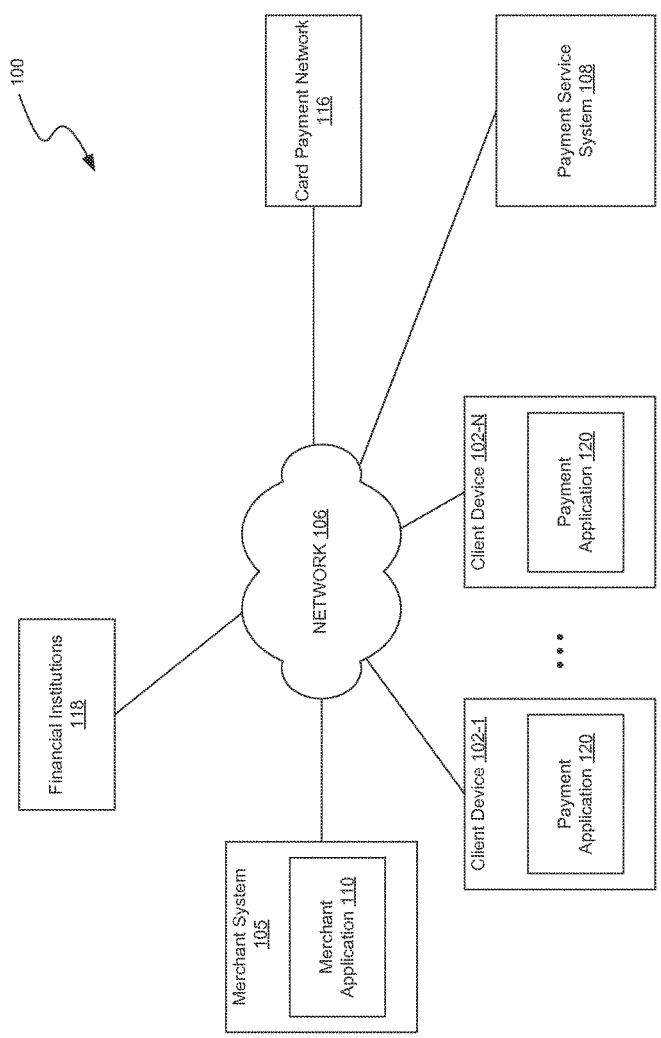
FIG. 1 is a block diagram illustrating a network-based environment in which the disclosed technologies can operate.

An application programming interface (API) is described for integrating merchant applications and/or systems with a payment service system to enable split bill payment and purchase transfer. In some embodiments, merchant applications and/or systems can integrate API modules provided by a payment service system to request payment of a bill that is split or shared among multiple bill payers ("split bill payment technology"). In other embodiments, merchant applications and/or systems can integrate the API modules to facilitate transfers of purchased "units" to other users ("purchase transfer technology").

In some embodiments, integrating the API with a point-of-sale (PoS) system enables merchants to split a bill among any number of users or bill payers and receive payments collected from the payers, without having to handle, e.g., swipe multiple payment cards or indeed, any payment card. Consider, for example, a party of five that receives a $200 bill (before or after tax (if applicable) and tip) at a restaurant. Suppose the party decides to divide the bill evenly among themselves, with each bill payer being responsible for $40. The restaurant can have a merchant application executing on a merchant system (e.g., PoS terminal). A bill splitting API provided by the payment service system can be integrated into the merchant application to enable the merchant application to send requests and/or data to the payment service system using various methods defined by the bill splitting API. A worker at the restaurant ("merchant") can input information (e.g., a username, an email address, a phone number, an alias, etc.) about each bill payer into the merchant application. Alternatively, if the merchant system and mobile computing devices ("mobile devices") of the bill payers have a Bluetooth Low Energy (BLE) radio turned on, the merchant system can establish a connection with each of the mobile devices using a BLE connection, and exchange information that can be used by the merchant application and the payment service system to automatically identify each bill payer in the party of five. In some embodiments, the merchant system can identify the bill payers using geo-fencing technology. Geo-fencing technology uses information from a Global Positioning System (GPS), cellular towers and/or Wi-Fi routers to compare a location of the bill payer's device to the merchant system's location to determine that the bill payer is at the merchant location. The merchant can also assign each bill payer a portion of the bill. In this example, each person is assigned $40. However, the merchant application can also be used to assign items in the bill to respective bill payers and determine each bill payer's share of the bill based on the assignment. The merchant application can then generate and send a split bill payment request that includes information identifying each bill payer in the party of five and a corresponding portion of the bill that the bill payer is responsible for via the bill splitting API. The split bill payment request is a request for payment of a bill that is split or shared among multiple bill payers. The payment service system sends a payment request in the amount of $40 to each bill payer (e.g., via a payment application on a mobile device, text message, email message). Each bill payer receiving the payment request approves the requested $40 or a different amount to pay for the bill payer's share of the bill, which would then be transferred from the bill payer's financial account to the merchant's financial account. In some embodiments, a bill payer can approve an amount different from the requested amount, but generally greater than the requested amount to pay for unaccounted costs, such as tax, tip, etc. For example, a bill payer in the party of the five can approve $47, the additional $7 being added for tip.

In this manner, the bill splitting API enables the merchant to use the merchant application to send a single split bill payment request to charge multiple bill payers respective portions of a bill. Consequently, the split bill payment technology significantly reduces the burden on the merchant and speeds up the time to clear a bill, as the merchant need not swipe multiple payment cards one by one to process multiple bills for multiple bill payers.

Various embodiments of the split bill payment technology are described. In some embodiments, a payment service system receives a request to split payment of a bill for a transaction associated with a merchant among multiple bill payers who have shared the transaction with the merchant. The request can include information identifying the merchant, multiple bill payers and a bill payer's portion of the bill, and the request can be received from a merchant application executing on a point-of-sale system operated by the merchant via a bill splitting application programming interface (API) provided by the payment service system. The merchant application is a third-party application that is not associated with the payment service system and the merchant has a financial account pre-registered with the payment service system. The payment service system can send a payment request to mobile devices of the bill payers for payment of the respective portions of the bill. The payment request can cause a payment application executing on a bill payer's mobile device to prompt the bill payer to approve the payment request. The payment service system can receive a response from the mobile devices of the bill payers, indicating an approval of a specified amount for payment of the bill payer's portion of the bill which can cause the payment service system to a transfer of the specified amount approved by the bill payers from the bill payers' financial accounts to the merchant's financial account and transmit, using the bill splitting API, a confirmation to the merchant application executing on the point-of-sale system indicating the payment of the bill by the multiple bill payers.

In some embodiments, a payment service system comprises a server that receives a request for split bill payment from a merchant system and analyzes the request to identify, for example, a merchant associated with the merchant system, multiple users, and the users' portion of the bill. The payment service system can then send a payment request to a mobile device of the users to obtain an approval to withdraw funds to pay for the users' portion of the bill from the users' financial account. When the payment service system receives a response from the users approving a withdrawal of a specified amount of funds from the users' financial account to pay for the users' portion of the bill, the payment service system initiates a transfer of the specified amount of funds approved by the users from the users' financial account to a financial account associated with the merchant.

In some embodiments, a merchant application executing on a merchant system receives an indication to split a bill among multiple bill payers and in response determines the bill payers' share of the bill. The merchant application then sends a split bill payment request to a payment service system. The split bill payment request can be sent using an application programming interface (API) provided by the payment service system and can include information identifying the bill payers, the bill payers' share of the bill, and the merchant. The split bill payment request causes the payment service system to collect payments corresponding to the bill payers' share of the bill and deposit the collected payments to a financial account associated with the merchant. The merchant application then receives a confirmation via the API of the deposit of the payments corresponding to the bill payers' share of the bill into the financial account associated with the merchant.

In some embodiments, integrating the API with the merchant application and/or system enables a user to transfer purchases. Consider for example, a user who purchases three tickets to an event using a merchant application of an event organizer ("merchant"). The merchant application can be integrated against a purchase transfer API provided by the payment service system that enables the merchant application to send the tickets, electronically, to a payment application (directly or through the payment service system) that the user can access. The user can assign one of the tickets worth $50 to a contact John and another one worth $75 to a contact Jane, and request a transfer. The payment service system can then send the ticket worth $50 to John and the ticket worth $75 to Jane. When John and Jane accept or "claim" the respective tickets, each acceptance automatically triggers a transfer of a value of the accepted ticket from a financial account associated with the receiver of the ticket to a financial account associated with the user. In some cases, information about the new ticket holders can be transmitted to the merchant via the purchase transfer API to enable the merchant to reissue the tickets in the names of the new ticket holders. The merchant can then send the reissued tickets to the new ticket holders.

In this manner, a merchant application can use the purchase transfer API to send purchase units or information about purchase units, which enables not only the transfer of the purchase units to others, but also collection of the monetary value of the transferred units. As used herein, a "purchase unit" or simply a "unit" is a unit of an item that was purchased and that has a monetary value or price associated with it. For example, a purchase unit can be one ticket having a value of $10 or one television set having a value of $500. Similarly, two purchase units can be two tickets, but both tickets need not have the same value. For example, one ticket can be worth $10, while another one worth $15. The purchase transfer technology disclosed herein is advantageous as a user can receive payments for the transferred units, and is not forced to give away the units for free. The burden on the user is also significantly reduced as the information relating to a purchase unit is transferred directly from the merchant application or system to the payment application or the payment service system. The user need only assign a purchase unit to a person (e.g., by selecting a contact from a contact list, inputting an email address or a phone number, by selecting a person who is detected to be nearby the user's device) to initiate a transfer of the purchase unit to that person. The payment service system can then collect the payment from that person, and deposit the payment into the user's financial account. Moreover, the technology enables a purchase unit to be transferred multiple times, while keeping the monetary value of the purchase unit fixed. Taking the example above, John can transfer his ticket to Jill and receive payment of $50 once Jill accepts or claims the ticket. Since the value of the ticket remains fixed with each transfer, the technology enables merchants to control the prices of purchase units regardless of the number of times the purchase units are transferred or resold. This prevents the practice of ticket scalping, which can artificially inflate prices of items.

Various embodiments of the purchase transfer technology are described. In some embodiments, the payment service system can receive information from a merchant system indicating that the merchant system completed a sale of a transferable ticket to a user. In other embodiments, the sale may be related to other items such as magazine subscription, phone, water bottles, etc., that the user may purchase from the merchant. The received information can identify, for example, a monetary value of the transferable ticket and the user who purchased the transferable ticket. The payment service system can determine that the user has a financial account registered with the payment service system. The payment service system can transmit information about the transferable ticket to a payment application executing on a user mobile device of the user who purchased the transferable ticket. The payment application is associated with the payment service system. The payment service system can receive a request from the payment application executing on the user mobile device to transfer the transferable ticket from the user to a receiver having a receiver mobile device. The receiver can be identified based on at least one of the receiver mobile device being within a pre-defined range of the user mobile device to enable the user and receiver mobile devices to exchange information over a Bluetooth Low Energy (BLE) wireless link or a list of contacts of the user accessible to the payment application on the user mobile device. The payment service system can send a transfer of the transferable ticket to the receiver and receive from the receiver a response accepting the transfer of the transferable ticket. Upon receiving the acceptance response, the payment service system can cause a transfer of an amount corresponding to the specific monetary value of the transferable ticket from a financial account associated with the receiver to the financial account associated with the user and transmitting a confirmation of the transfer of the transferable ticket to the user. In some embodiments, even if the user has no financial account registered with the payment service system, the payment service system can receive the transfer request but hold off processing the transfer request until the user registers a financial account by providing information about a payment card (e.g., credit/debit/pre-paid card number, expiration date, card verification value, expiration date, etc.) to the payment service system. Similarly, in some embodiments, the receiver may not have a financial account registered with the payment service system. The payment service system can, prior to sending the transfer of the transferable ticket to the receiver, the access a datastore that stores user information associated with a plurality of users using at least one of a receiver email address or receiver phone number included in the request to determine that the receiver has no financial account registered with the payment service system. In such a case, the payment service system can send a notification to the receiver using the receiver email address or receiver phone number to register a financial account with the payment service system to cause the transfer of the amount corresponding to the specific monetary value of the transferable ticket from the financial account associated with the receiver to the financial account associated with the user and complete the transfer of the transferable ticket from the user to the receiver.

In some embodiments, the payment service system comprises a server and the server can receive purchase information from a merchant system. The purchase information can include, for example, information that identifies a unit purchased by a first user at the merchant system, a price of the unit and the first user. When the server receives a request from a client device of the first user to transfer the unit to a second user, the server can send a request to a client device of the second user to accept the transfer of the unit. The server can receive a response from the client device of the second user accepting the transfer of the unit and in response, withdraw an amount corresponding to the price of the unit from a financial account associated with the second user and deposit the withdrawn amount to a financial account associated with the first user. The server can also notify the first user of the transfer of the unit to the second user.

In some embodiments, a payment application executing on a computing system of a first user can receive and display on a user interface of the computing system, information identifying a first unit purchased by the first user and a price of the first unit paid by the first user. In some embodiments, the information identifying the first unit purchased by the first user and the price of the first unit paid by the first user can be received from a merchant system remote from the computing system. In other embodiments, the information identifying the first unit purchased by the first user and the price of the first unit paid by the first user can be received by the payment application executing on the computing system from a merchant application executing on the same computing system. In yet other embodiments, the information identifying the first unit purchased by the first user and the price of the first unit paid by the first user may be received from a payment service system. In such embodiments, the first user may have purchased the first unit from a second user, instead of the merchant system.

The payment application can also identify potential recipients for user selection. In some embodiments, the potential recipients for user selection can be identified based on a connection established between the computing system and client devices of the potential recipients using a near-field communication technology, for example, a Bluetooth Low Energy wireless technology. The payment application can further receive a selection of a second user from the potential recipients as a recipient of a transfer of the first unit and receive a request to transfer the first unit to the second user. In response, the payment application can cause a transfer of an amount corresponding to the price of the first unit from a financial account of the second user to a financial account of the first user.

Various embodiments of the disclosed technologies will now be described. The following description provides specific details for a thorough understanding and an enabling description of these embodiments. One skilled in the art will understand, however, that the disclosed systems and methods may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the disclosed technologies.

FIG. 1 is a block diagram illustrating a network-based environment in which the disclosed technologies can operate. The environment 100 includes a payment service system 108, multiple client devices 102-1, . . . , 102-N, multiple financial institutions 118, one or more merchant systems 105, and a card payment network 116.

The client devices 102-1, . . . , 102-N (hereinafter "client devices 102") are associated with end-users. In some embodiments, client devices 102 have payment applications 120 associated with the payment service system 108 installed thereon. The payment application 120 can be used by a user to send payments or payment requests to other users. The payment application 120 can also be used by the user to receive payment requests from other users and receive notifications of payments made by other users. The client device 102 can be a desktop computer, a laptop computer, a mobile device, a tablet, or any other processing device. The mobile device can be, for example, a smart phone, a tablet computer, a phablet, a notebook computer, a wearable device, or any other form of mobile processing device. In some embodiments, the client device 102 can include a network interface based on Bluetooth technology (e.g., Bluetooth Low Energy or BLE) to enable the client device 102 to detect and establish a connection with another client device 102 having a similar network interface that is nearby, and exchange information over the established connection.

In some embodiments, the payment application 120 executing on the client device 102 can interface with the network interface and provides user identifying information for exchange with other nearby client devices 102. Such user identifying information that can be exchanged between client devices that have established a connection between each other can include, but is not limited to: a user identifier (e.g., username or UID), an application identifier, a device identifier, a phone number, an email address, an alias, or any other information that enables a payment application 120 of one client device, e.g., client device 102-1 to, directly or by querying a remote server (e.g., payment service system 108), identify a user of a connected client device, e.g., client device 102-2.

The environment 100 can include computer systems of financial institutions or banks 118. The financial institutions 118 include banks associated with users and merchants. For example, some financial institutions issue payment cards (e.g., debit cards, credit cards, prepaid cards, gift cards, and so on) to users. Each user has a financial account with a financial institution 118 and can use a payment card issued by the financial institution 118 to access the user's financial account to deposit or withdraw funds.

The environment 100 also includes a computer system of a card payment network (hereinafter "card payment network 116") which can be a credit and/or debit card processing network that handles authorization and settlement of transactions made using debit and/or credit cards.

The environment 100 also includes a computer system of a payment service (hereinafter "payment service system 108") associated with the payment application 120. The payment service system 108 facilitates electronic transfer of money from a financial account of one user to a financial account of another user. In order for the transfer of money to occur, the user sending the money and the user receiving the money each have a user account with the payment service system 108. The user account is associated with or linked to a payment card such as a debit card, a credit card, a prepaid card, or the like. In this manner, the financial accounts of the users are pre-registered with the payment service system 108.

Generally, a user can send a payment or request for payment of a specified amount using the payment application 120. The payment application 120 automatically generates an email message, text message, instant message, or the like, populated with the necessary information for sending by the sender. For example, the "To" field of the email message can be populated with the email addresses of the recipients identified by the payment application 120 (e.g., based on BLE connection) or input by the sender, the "cc" field can be populated with an email address associated with the payment service system 108 and the amount of the payment or the request for payment can be included in the body of the message. In other embodiments, the payment application 120 can generate a text message or an HTTP request including the recipient information, the amount of the request, and a type of the request (e.g., payment or payment request).

The payment service system 108 receives the email message (or text message or HTTP request) sent by the sender and parses the email message to extract a sender email address of the sender, receiver email addresses of the receivers and the amount to be requested or sent. If the email message is for sending a payment request, the payment service system 108 can send an email message or a push notification to each of the receiver email addresses to notify the receivers regarding the sender's payment request. A receiver can then approve the request (e.g., via the email message, the push notification) to trigger the transfer of the approved payment amount from the receiver's financial account at a financial institution 118 to the sender's financial account at a financial institution.

If the email message is for sending a payment, the payment service system 108 generates and sends a payment request including the necessary information (e.g., a payment amount, the sender's payment card information, the receiver's payment card information) to the card payment network 116 (e.g., Star, NYCE or Pulse for debit card processing and Visa, MasterCard, etc., for debit/credit card processing) for authorization and settlement. The card payment network 116 communicates with the financial institutions 118 of the sender and the receiver to facilitate the transfer of the payment amount. After the payment request is approved, the financial institution of the sender debits the sender's financial account in real time. As a part of the settlement process, the payment amount debited from the sender's financial account is sent to the receiver's financial account and the receiver's financial account is credited, thereby completing the transaction. Once the transaction is completed, a notification regarding the crediting or deposit of the payment amount can be sent to the receivers (e.g., via an email message, a text message, a push notification).

The environment 100 also includes merchant systems 105 associated with merchants. A merchant system 105 can be a point of sale (PoS) at which a user can make a payment to the merchant in exchange for goods provided or services rendered. The merchant system 105 can include, but is not limited to: a PoS terminal, an electronic cash register, a tablet or other mobile device based PoS, and/or any processing device that can execute a merchant application 110 to enable transactions. In some embodiments, the merchant system 105 can also be a server hosting a merchant website providing checkout functionality. The merchant application 110 can be integrated against an API or APIs provided by the payment service system 108. The API integration enables the merchant application 110 to send requests and/or other data to the payment service system 108 using specific methods defined by the API, and receive responses from the payment service system 108.

Each of the aforementioned computer systems can include one or more distinct physical computers and/or other processing devices which, in the case of multiple devices, can be connected to each other through one or more wired and/or wireless networks. All of the aforementioned devices are coupled to each other through an internetwork 106, which can be, or include, the Internet and one or more wired or wireless networks (e.g., a Wi-Fi network and/or a cellular telecommunications network).

It should be noted that the environment 100 can accommodate transactions involving payment cards such as debit cards, credit cards, pre-paid cards, bank accounts, mobile payment applications and the like. The payment application 120 can include an electronic wallet application, money transfer application (e.g., application for sending and requesting payments via email or text message), or any other application having an account that is linked to one or more payment cards and/or financial accounts and can be used by the owner of the client device to initiate transactions.

Figure 2:
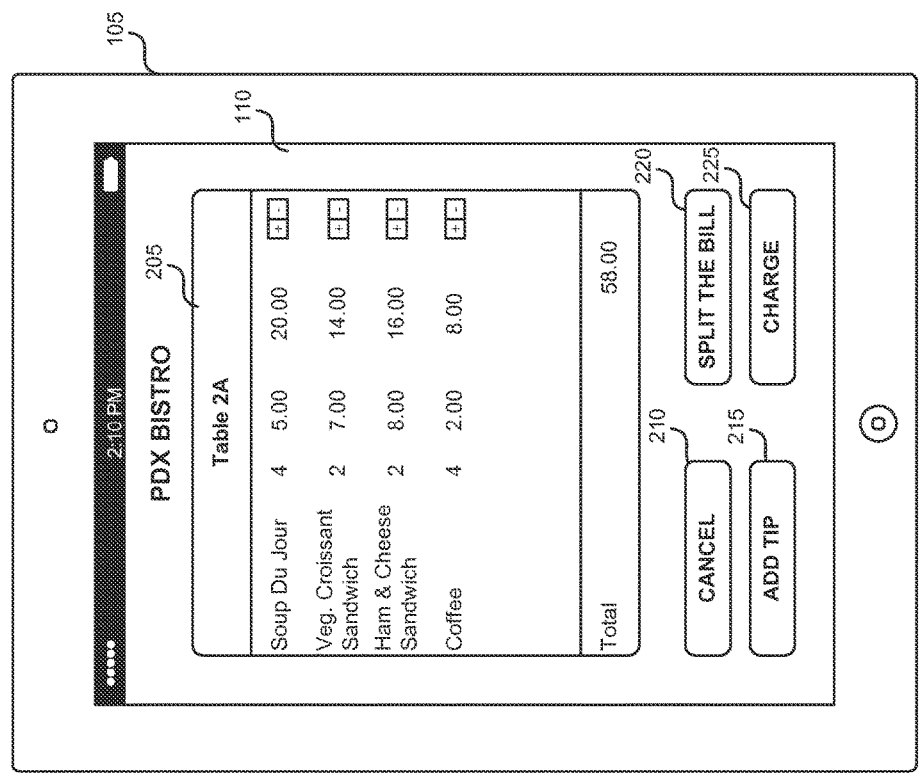
FIG. 2 is a user interface diagram illustrating an example checkout interface of a merchant application executing on a merchant system.

FIG. 2 is a user interface diagram illustrating an example checkout interface of a merchant application executing on a merchant system.

The example checkout interface is applicable to a restaurant type merchant. The checkout interface of a merchant application 110, executing on a merchant system 105, depicts an itemized bill 205. The itemized bill 205 lists items of order, quantities, prices and a total. In some embodiments, the checkout interface can include a cancel button 210 to cancel and go back to a previous screen, an add tip button 215 to add a tip to the total amount, and a charge button 225 to charge the bill 205 to a payment card or conduct a cash transaction. In some embodiments, the checkout interface can also include a "split the bill" button 220 which when selected causes the merchant application 110 to identify bill payers among whom the bill is to be split, and generate and send a split bill payment request to the payment service system 108.

Figure 3:
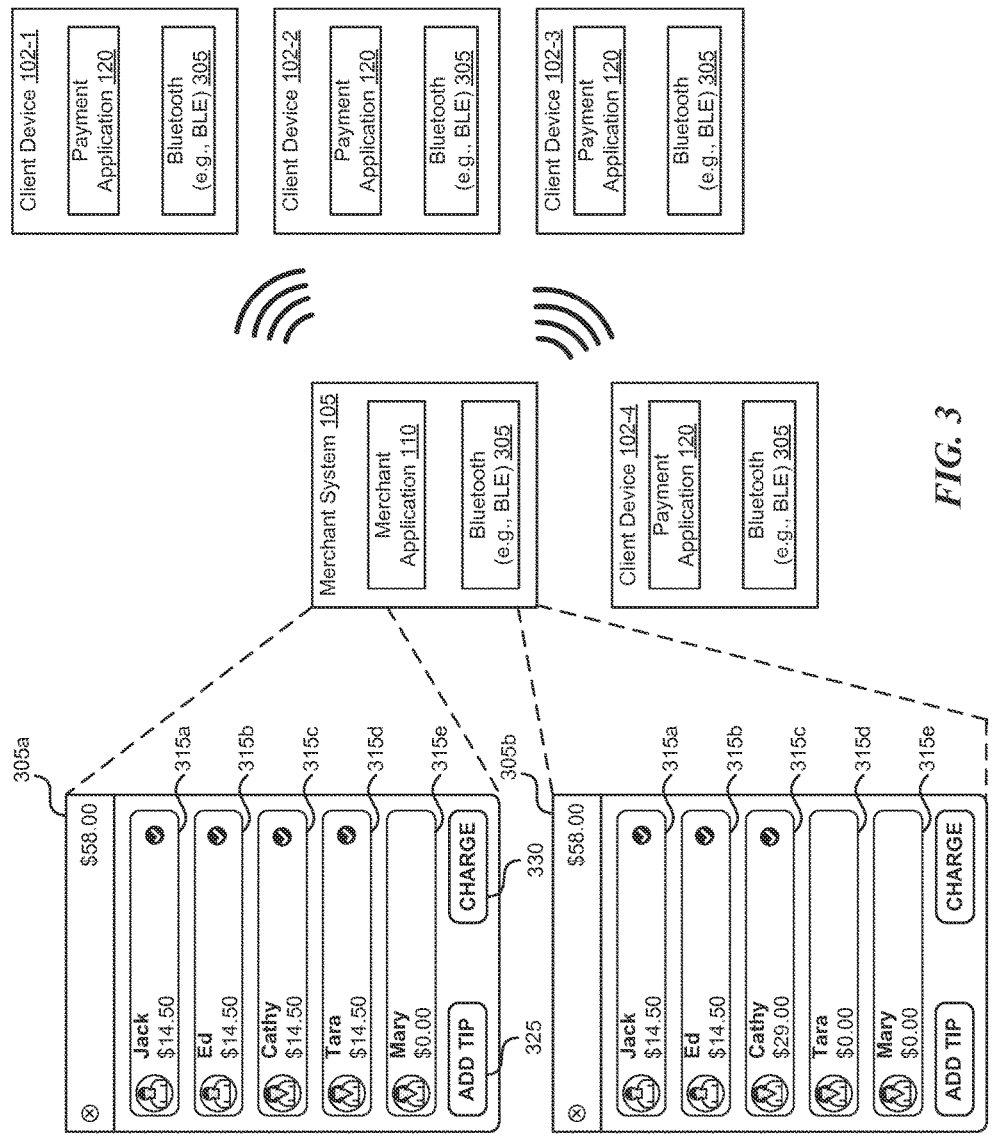
FIG. 3 is a block diagram illustrating an example user interface for splitting a bill among bill payers.

FIG. 3 is a block diagram illustrating an example user interface for splitting a bill among bill payers.

In some embodiments, when the "split the bill" button 220 in FIG. 2 is selected, the selection causes the merchant application 110 executing on the merchant system 105 to establish a connection with nearby client devices over a low energy wireless connection (e.g., BLE connection via the BLE interfaces 305 of the merchant system 105 and the client devices 102-1, 102-2, and 102-3) and exchange information with each other over the BLE connection. By way of example, client devices 102-1, 102-2, 102-3 and 102-4 are shown to be nearby. In some embodiments, the client devices have payment applications 120 installed thereon. In other embodiments, the client devices may not have payment applications 120 installed thereon. The client device 102-1 can provide information that identifies or that can be used to identify a user associated with the client device (e.g., username "Jack D.," an email address, a phone number, an alias, a device identifier, an application identifier, or the like) to the merchant system 105, and the merchant system 105 can, in turn, provide information identifying the merchant (e.g., "PDX Bistro, Portland") to the client-device 102-1. The merchant application 110 can display information about the users associated with the nearby client devices to which it is connected on a user interface, such as the user interface 305a. The user interface 305a shows a list of users that are nearby the merchant system 105. The user of the merchant application 110 ("merchant") can select some or all of the nearby users as bill payers among whom the bill is to be split. For example, the user interface 305a shows that users 315a-d are selected to be the bill payers, and the user 315e is not selected. The bill of $58 is equally split among the bill payers 315a-d, such that each bill payer's portion is $14.50. In the example user interface 305b, users 315a-c have been selected as bill payers, while users 315d-e are not selected. The amount of the bill can again be equally distributed among the three bill payers. However, in some embodiments, each bill payer can be assigned a desired portion of the bill. For example, in the user interface 305b, bill payer 315c is assigned two-thirds of the bill (e.g., $29) while the bill payers 315a and 315b are each assigned one-thirds of the bill (e.g., $14.50). In some embodiments, the merchant application 110 can determine each bill payer's share of the bill based on items assigned to the bill payer.

In some embodiments, the user interface of the merchant application 110 can include an "add tip" button 325 to add tip to each bill payer's portion of the bill. A similar option for tax or other surcharges can also be included in some embodiments. Once each bill payer's share of the bill has been determined, the "charge" button 330 can be activated, which causes the merchant application 110 to generate a split bill payment request based the information about the bill payers and their respective shares of the bill, and send the request to the payment service system 108. The request can be sent using the bill splitting API, over HTTP/S for example, and can include, but is not limited to: identifiers corresponding to the bill payers, each bill payer's share of the bill, and a merchant identifier.

Figure 4A:
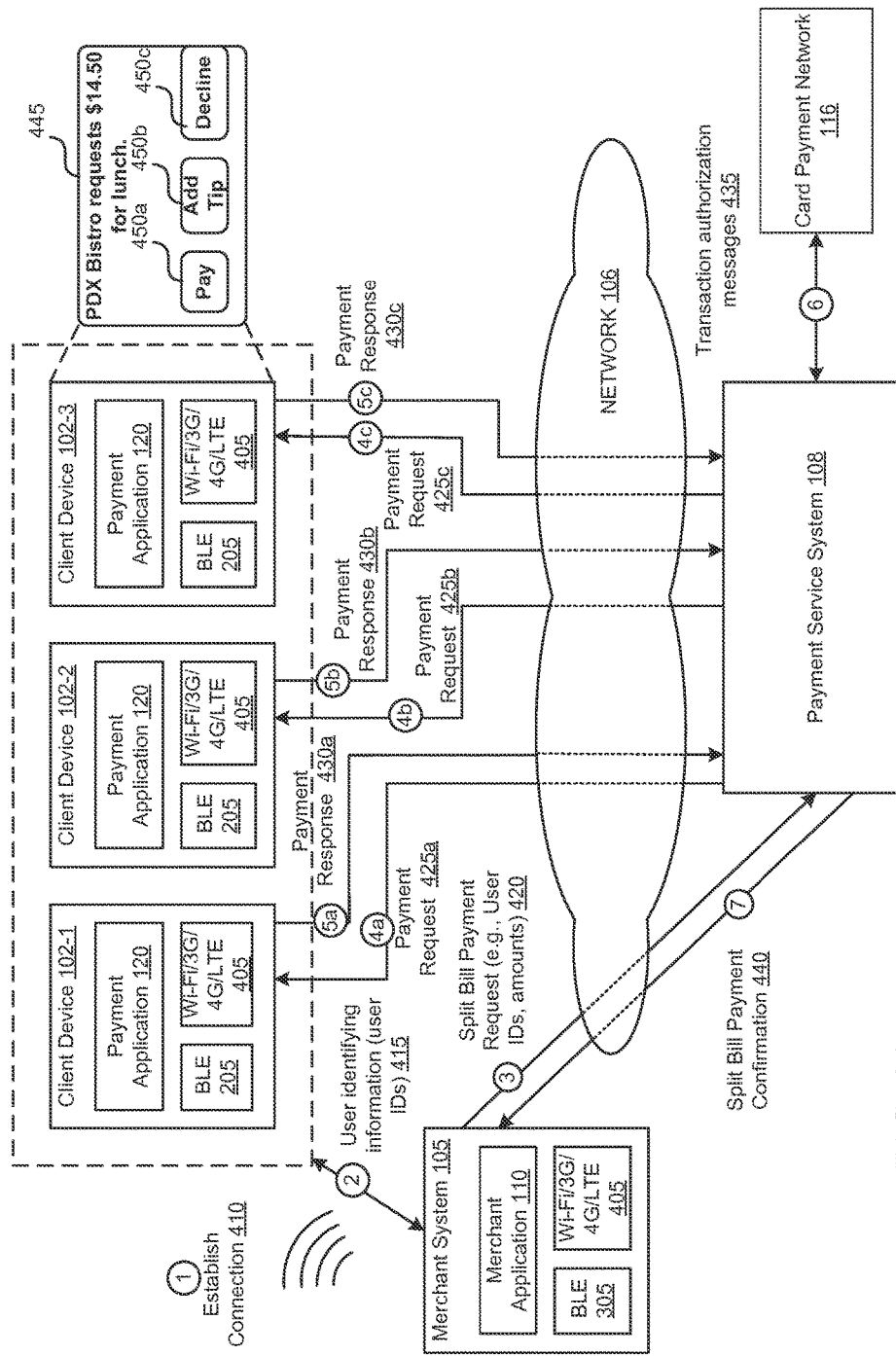
FIG. 4A is a block diagram illustrating an example split bill payment flow involving a merchant system, multiple client devices and a payment service system in accordance with a first embodiment.

FIG. 4A is a block diagram illustrating an example split bill payment flow involving a merchant system, multiple client devices and a payment service system in accordance with a first embodiment.

As illustrated, the merchant system 105, multiple client devices (e.g., 102-1, 102-2, and 102-3) and the payment service system 108 are each coupled to a network 106 for transmission of requests and responses. The merchant system 105 establishes a connection with nearby client devices 102-1, 102-2 and 102-3 over a BLE connection 410 supported by the BLE interface (or radio) 305 on the merchant system 105 and the BLE interface (or radio) 205 on the client devices 102-1, 102-2 and 102-3. In some embodiments, other low energy wireless technologies may be used by the merchant system 105 to establish a connection with the client devices. The merchant system 105 and the client devices can also include other network interfaces, e.g., Wi-Fi/3G/4G/LTE 405 to facilitate communication (e.g., data transfer) between the client devices and the merchant system 105 over network 106. In some embodiments, communication between the merchant system 105 and the client devices facilitated by network 106 can occur when the client devices are within a predefined range of the merchant system 105. The payment application 120 on a client device, enabled by GPS, cell tower and/or Wi-Fi data, can detect when the client device is within, for example, a range of 100 meters, from the merchant location (i.e., where the merchant system 105 is located), and can provide user identifying information to the merchant system 105 over network 106.

In some embodiments, the merchant application 110 executing on the merchant system 105 can use the established connection 410 to exchange information with the payment applications 120 executing on the nearby client devices to identify users of the client devices 415. The information that is exchanged can include, but is not limited to: a username, a user identifier, an email address, a phone number, a device identifier, an application identifier, an alias, or the like. The merchant can select all or some of the nearby users to be the bill payers, and assign to each bill payer a portion of the bill. The merchant can then use the merchant application 110 to submit a split bill payment request 420 to the payment service system 108. The split bill payment request can include information such as, but not limited to: a merchant identifier, identifiers associated with the bill payers, and each bill payer's portion or share of the bill. The request is submitted to the payment service system using a bill splitting API provided by the payment service system 108.

The payment service system 108 receives the split bill payment request 420 from the merchant application 110 and analyzes the request to identify the merchant, the bill payers and each bill payer's share of the bill. In some embodiments, the payment service system 108 can determine whether the bill payers have a financial account registered with the payment service system. For example, the payment service system 108 can determine that one of the bill payers does not have a financial account registered with the payment service system, and in response, can send a request to the bill payer (e.g., using the bill payer's email address or phone number included in the split bill payment request) to request the bill payer to register a financial account with the payment service system by providing details of a payment card, e.g., payment card number, security code, expiration date, address, and/or the like, or a bank account from which funds can be withdrawn for bill payment. The payment service system 108 generates and sends payment requests 425a, 425b and 425c to the bill payers' client devices 102-1, 102-2 and 102-3 respectively. The payment requests can be sent via an email, a text message, instant message, an HTTP/S request, or the like. The payment applications 120 on the client devices can receive the payment requests and prompt the bill payers to confirm the payment requests from the merchant. For example, the payment application 120 executing on the client device 102-3 can display a notification (e.g., 445) based on the payment request 425c and obtain a response from the bill payer. The notification 445, as shown, can identify the merchant ("PDX Bistro") and a bill amount ("$14.50") that is being requested. The bill payer can select a "pay" button 450a to approve an amount corresponding to the payment request (e.g., the bill payer's share of the bill). The bill payer can select the "add tip" button 450b to add tip (e.g., $3.00) to the requested amount ("$14.50") and approve an amount different from the requested amount (e.g., approve $14.50+$3.00 or $17.50 instead of $14.50). The "decline" button 450c can be selected by the bill payer to decline the payment request. The bill payers' responses 430a-c to the payment requests 425a-c are transmitted by the payment applications 120 to the payment service system 108. In some embodiments, if a bill payer does not have a payment application 120 on his or her client device, a payment request can still be sent to the bill payer's client device as an email message or a text (e.g., SMS, MMS message). The bill payer can then respond to the email message or text message to approve an amount for bill payment. In some embodiments, the message can include a link, which when selected redirects the bill payer to a webpage from where the user can approve an amount.

After receiving responses approving the payment requests, the payment service system 108 identifies each bill payer' financial account and a financial account associated with the merchant. The payment service system 108 can then exchange transaction authorization messages 435 with the card payment network 116 to cause an amount approved by each bill payer to be transferred from the bill payer's financial account to the financial account of the merchant. The payment service system 108 can then use the bill splitting API to send a split bill payment confirmation 440 to the merchant application 110 as a response to the split bill payment request 420.

Figure 4B:
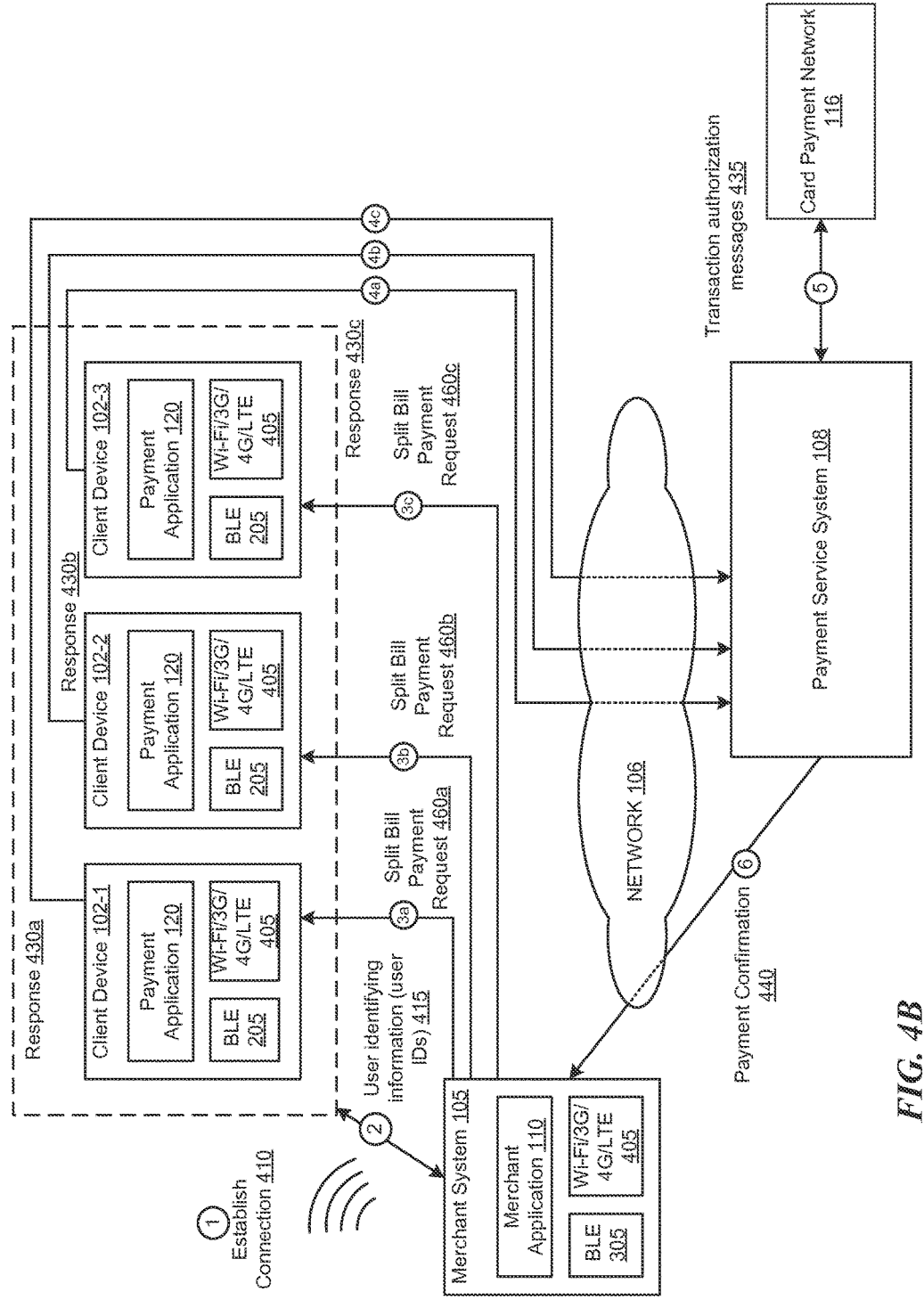
FIG. 4B is a block diagram illustrating an example split bill payment flow involving a merchant system, multiple client devices and a payment service system in accordance with a second embodiment.

FIG. 4B is a block diagram illustrating an example split bill payment flow involving a merchant system, multiple client devices and a payment service system in accordance with a second embodiment.

Similar to the first embodiment described in relation to FIG. 4A, the second embodiment also includes the merchant system 105, multiple client devices (e.g., 102-1, 102-2, 102-3) and the payment service system 108 are each coupled to the network 106 for transmission of requests and responses. The merchant system 105 can include the merchant application 110, a BLE interface 305 and a Wi-Fi/3G/4G/LTE interface 405. The client devices 102-1, 102-1 and 102-3 can each include a payment application 120, a BLE interface 205 and a Wi-Fi/3G/4G/LTE interface 405. However, in this embodiment, the client devices (e.g., 102-1, 102-2 and 102-3) can each receive a split bill payment request directly from the merchant system 105 over a BLE connection, or other low energy wireless connection.

As described in relation to FIG. 4A, the merchant system 105 establishes a connection 410 with the nearby client devices client devices 102-1, 102-2 and 102-3 and exchanges user identifying information 415 with each of the client devices to enable the merchant application 110 to identify users of the client devices that are nearby and the client devices to identify the merchant. The merchant then selects all or some of the nearby users to be the bill payers, and assign to each bill payer a portion of the bill. However, instead of sending a split bill payment request to the payment service system 108 using the bill splitting API, the merchant application 110 sends split bill payment requests 460a, 460b and 460c directly to the bill payers' client devices 102-1, 102-2 and 102-3 respectively over the BLE connection.

The payment applications 120 on the client devices receive the split bill payment requests from the merchant system 105. As described in relation to FIG. 4A, the payment applications 120 prompt the bill payers to confirm the payment requests from the merchants and transmit the bill payers' responses 430a-c to the payment service system 108 to enable the payment service system 108 to communicate with the card payment network 116 to initiate a transfer of an amount approved by each bill payer from the bill payer's financial account to the merchant's financial account. For example, the payment service system 108 can exchange transaction authorization messages 435 with the card payment network 116. Once the money transfer transactions have been authorized, the payment service system 108 can send a payment confirmation 440 to the merchant system 105.

FIG. 5A is a user interface diagram illustrating an example checkout interface of a merchant including an option to transfer purchase units.

In some embodiments, the merchant system 105 can be a merchant server, and the merchant application 110 can be a web-based application or website hosted on the merchant server or a mobile application supported by the merchant server. In relation to FIG. 5A, the merchant application 110 is accessed using a browser application 505 on a client device associated with a user. The checkout interface 510 is displayed after a purchase order 515 for four tickets, i.e., purchase units, has been placed and paid for by the user. In some embodiments, the checkout interface 510 can include a "transfer ticket" option 520 that when selected by the user causes purchase unit information or purchase data to be transmitted to a payment application 120 on the user's client device. In some embodiments, the purchase unit information can be transmitted to the payment service system 108 using the purchase transfer API that is integrated with the merchant application 110 and/or the merchant system 105. The payment service system 108 can then forward the purchase unit information to the payment application 120 on the user's client device. Alternatively, in some embodiments, selecting the "transfer ticket" button 520 can cause the purchase unit information to be transmitted directly to the payment application 120 on the same client device.

In some embodiments, the transfer of the purchase unit information can occur automatically, without the user having to initiate the transfer by selecting the "transfer ticket" button 520, for example. The payment service system 108 receiving the purchase unit information can then request the user to confirm whether the user would like to transfer any of the purchase units to another. In other embodiments, the payment service system 108 can prompt the user for transfer if the purchase unit meets one or more criteria. Examples of such purchase transfer eligibility criteria can include, but are not limited to: at least two purchase units (e.g., two or more television sets, or two or more concert tickets), transfer requested within a certain period from the purchase date, the number of times a purchase unit has been transferred, and/or the like.

FIG. 5B is a user interface diagram illustrating an example interface of a payment application associated with a payment service system for transfer of purchase units to another.

The user interface 530 of the payment application 120 depicts purchase units 540a-d and their monetary values (e.g., 545a) determined from the purchase unit information received from the merchant (e.g., FIG. 5A). The user interface 530 can also include, alongside each purchase unit, a drop down menu or other similar user interface element that enables the user to scroll through a list of users that can include contacts and/or nearby individuals (e.g., if the nearby feature 535 is enabled) and select one of the listed users as the receiver of the purchase unit. For example, the purchase unit 540a is initially assigned to "me," i.e., the user. The purchase units 540a and 540b are each assigned to the receiver "Ed," while the purchase unit 540c is being assigned to the receiver "Jack" After assigning each purchase unit to a respective receiver, the user can activate the "confirm transfer" button 560 to trigger the transfer of the purchased units 540b-d to the respective receivers.

Figure 6:
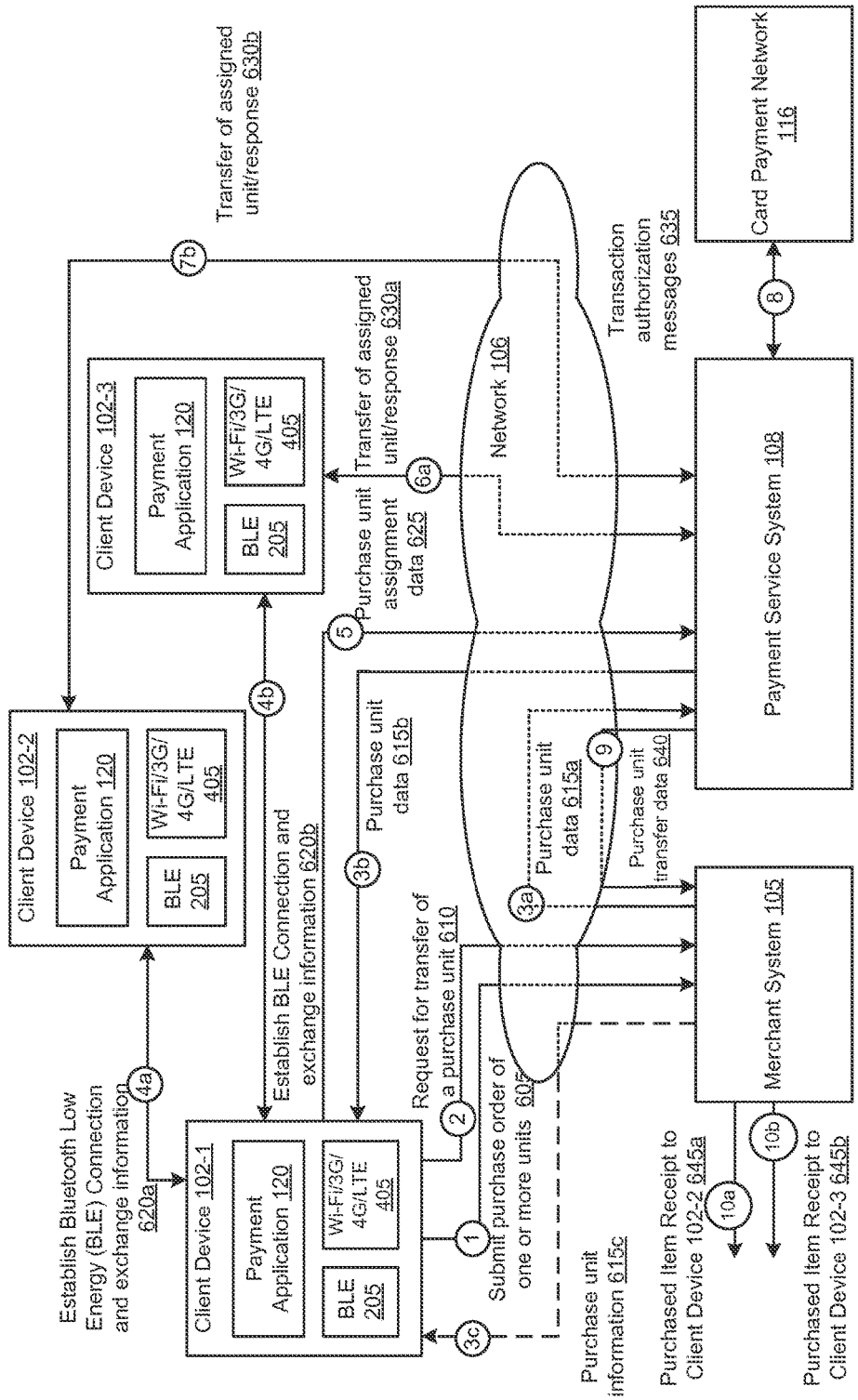
FIG. 6 is a block diagram illustrating a purchase transfer flow involving a merchant system, multiple client devices and a payment service system in accordance with a third embodiment.

FIG. 6 is a block diagram illustrating a purchase transfer flow involving a merchant system, multiple client devices and a payment service system in accordance with a third embodiment.

As illustrated, the merchant system 105, multiple client devices (e.g., 102-1, 102-2, 102-3) and the payment service system 108 are each coupled to a network 106 for transmission of requests and responses. A user of the client device 102-1 uses a merchant application or a merchant website to place a purchase order 605 of multiple units with the merchant system 105. In some embodiments, the user of the client device 102-1 can also provide an indication 610 to transfer the purchase units to the merchant system 105. In some embodiments, the merchant system 105 can transmit the purchase unit data 615a to the payment service system 108, which in turn can forward the purchase unit data 615b to the payment application 120 on the client device 102-1. In other embodiments, the merchant system 105 can transmit the purchase unit data 615c directly to the client device 102-1.

In some embodiments, the client device 102-1 can establish a BLE connection with multiple nearby client devices, for example, client devices 102-2 and 102-3 and exchange information (e.g., 620a, 620b) using the BLE interface 205 on the client devices. The client devices can also include other network interfaces, e.g., Wi-Fi/3G/4G/LTE interfaces to connect to the network 106, and in some instance to each other (e.g., using local Wi-Fi). The BLE connection enables the client device 102-1 to identify the users of the client devices 102-2 and 102-3. The payment application 120 can use the user's contacts and/or the nearby users to build a list. The user can then assign a purchase unit to a receiver selected from the list. The purchase unit assignment data 625 can then be transmitted to the payment service system 108. Taking the example of FIG. 5B, the purchase unit assignment data can identify each ticket for transfer, the monetary value of the ticket, and the receiver of the ticket. Referring to FIG. 6, the payment service system 108 can, based on the purchase unit assignment data, send a transfer of assigned purchase unit to the client device of the receiver of the purchase unit and receive a response (e.g., 630a, 630b, 630c). Continuing with the example of FIG. 5B, suppose receiver "Ed" is associated with the client device 102-2, and receiver "Jack" is associated with the client device 102-3. Then the payment service system 108 sends to the receiver Ed's client device, a transfer of tickets 540b and 540c each having a monetary value of $149. Similarly, payment service system 108 sends to receiver Jack's client device a transfer of ticket 540d having a monetary value of $149.00.

Each receiver can accept or claim the transfer of the purchase unit or units. Alternatively, the receiver can decline the transfer of the purchase unit or units. In some embodiments, the receiver can also partially accept the transfer of purchase units. For example, if a receiver receives a transfer of two tickets, but needs only one, the receiver can accept one ticket and decline the other one. The receivers' responses can then be transmitted by the payment applications 120 to the payment service system 108. When the payment service system 108 receives responses from the receivers accepting the transfers of the purchase units, it can exchange transaction authorization messages 635 with the card payment network 116 to cause an amount corresponding to the total monetary value of a transfer accepted by a receiver to be transferred from the receiver's financial account to a financial account of the user who initiated the transfer. For example, if receiver Ed accepts the transfer of the two tickets, the payment service system 108 initiates a transfer of $298 corresponding to the total monetary value of the transfer from receiver Ed's financial account to the financial account of the user. By way of another example, if receiver Ed accepts the transfer of only one of the two tickets, then a monetary value of the one ticket accepted by receiver Ed is transferred from his financial account to the financial account of the user.

In some instances, information about the transfer of the purchase units may be needed by the merchant for various reasons. For example, in the case of tickets, new tickets may need to be issued to the current ticket holders. Similarly, the merchant may need to know who the end owner of a purchase unit is in case of product recalls, for physical or digital delivery of the unit, for receipt delivery, or the like. Thus, in some embodiments, the payment service system 109 can send purchase unit transfer data 640 to the merchant system 105. In some embodiments, the merchant system 105 can then provide receipts 645a, 645b to the receivers of the transfer. For example, receiver Ed can receive two tickets reissued in his name and receiver Jack can receive one ticket reissued in his name.

Figure 7:
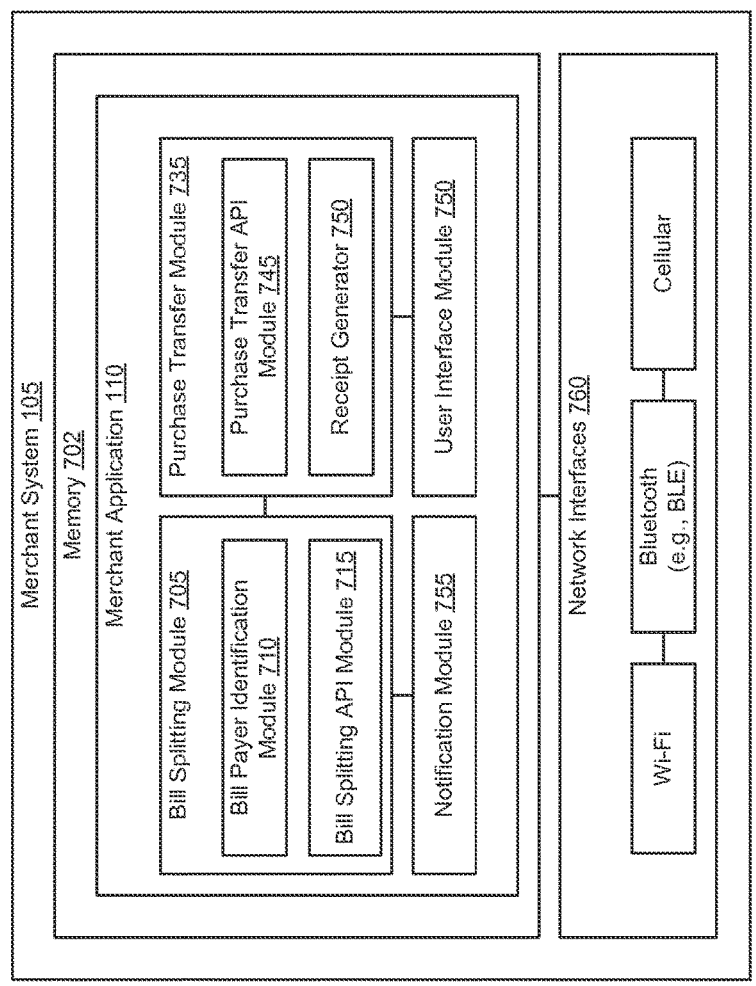
FIG. 7 is a block diagram illustrating example components of a merchant system implementing the disclosed technologies.

FIG. 7 is a block diagram illustrating example components of a merchant system implementing the disclosed technologies.

In some embodiments, the merchant system 105 includes memory 702 for storing instructions associated with multiple modules of the merchant application 110, and network interfaces 760, among components. The merchant application 110 can include various modules including a bill splitting module 705 having a bill payer identification module 710 and bill splitting API module 715, a purchase transfer module 735 having a purchase transfer API module 745 and a purchase transfer receipt generator 750, a user interface module 750 and a notification module 755, among others. It should be noted some embodiments of the merchant application may exclude the purchase transfer module 735, while other embodiments may exclude the bill splitting module 705.

In some embodiments, the bill splitting module 705 can be triggered by an indication from a merchant to split a bill among multiple bill payers. The bill payer identification module 710 can identify multiple users having mobile devices that are connected to the merchant system 105 over a low energy wireless connection, or are otherwise in proximity to the merchant system 105. The bill payer identification module 710 can then identify at least some of the nearby users as bill payers among whom the bill is to be split. The identification can be based on a selection or confirmation from the merchant. The bill splitting module 705 can also determine each bill payer's share of the bill. The determination can be based on indications from the merchant. For example, by default, the bill splitting module 705 can split a bill equally among the bill payers. In some embodiments, the module 705 can receive assignment of items on the bill to the respective bill payers, and determine each bill payer's share of the bill based on the received assignment of items and associated prices.

In some embodiments, the bill splitting API module 715 uses information identifying the bill payers and each bill payer's share of the bill and information identifying the merchant to generate and send a split bill payment request to the payment service system 108. Sending the split bill payment request can cause the payment service system 108 to collect payments corresponding to each bill payer's share of the bill and deposit the collected payments to a financial account associated with the merchant identifier. The bill splitting API module 715 can also receive from the payment service system a confirmation of the deposit of the payments corresponding to each bill payer's share of the bill to the financial account associated with the merchant identifier. In some embodiments, the notification module 755 can generate a receipt or notification for each bill payer for the payment of the bill payer's share of the bill.

The purchase transfer module 735 facilitates transfer of purchase units. In some embodiments, the purchase transfer API module 745 receives and sends purchase unit information to the payment service system 108 via the purchase transfer API. In other embodiments, the purchase transfer API module 745 can also send purchase unit information directly to a payment application of the user associated with the purchase of the units. In some embodiments, the sending can occur automatically, while in others, the sending can occur in response to a user input. In some embodiments, the purchase transfer API module 745 can also receive purchase unit transfer data from the payment service system 108 via the purchase transfer API. The purchase unit transfer data can be used by the receipt generator 750 to generate receipts (e.g., reissue tickets) for the receivers of the transfers.

In some embodiments, the merchant application includes a notification module 755 can generally handle generation and display of any incoming and/or outgoing notifications such as push notifications, email, text messages, and/or the like. The user interface module 750 provides various components for building graphical user interfaces of the merchant application 110. The network interface 760 can be a networking module that enables the merchant application 110 to transmit and/or receive data in a network with an entity that is external to the client device 102 (e.g., other client devices, the payment service system 108), through any known and/or convenient communications protocol supported merchant system 105 and the external entity. The network interface 760 can include one or more of a network adaptor card, a wireless network interface card (e.g., SMS interface, Wi-Fi interface, interfaces for various generations of mobile communication standards including but not limited to 1G, 2G, 3G, 3.5G, 4G, LTE, etc.,), Bluetooth (e.g., BLE), a router, an access point, a wireless router, a switch, a multilayer switch, a protocol converter, a gateway, a bridge, bridge router, a hub, a digital media receiver, and/or a repeater.

Figure 8:
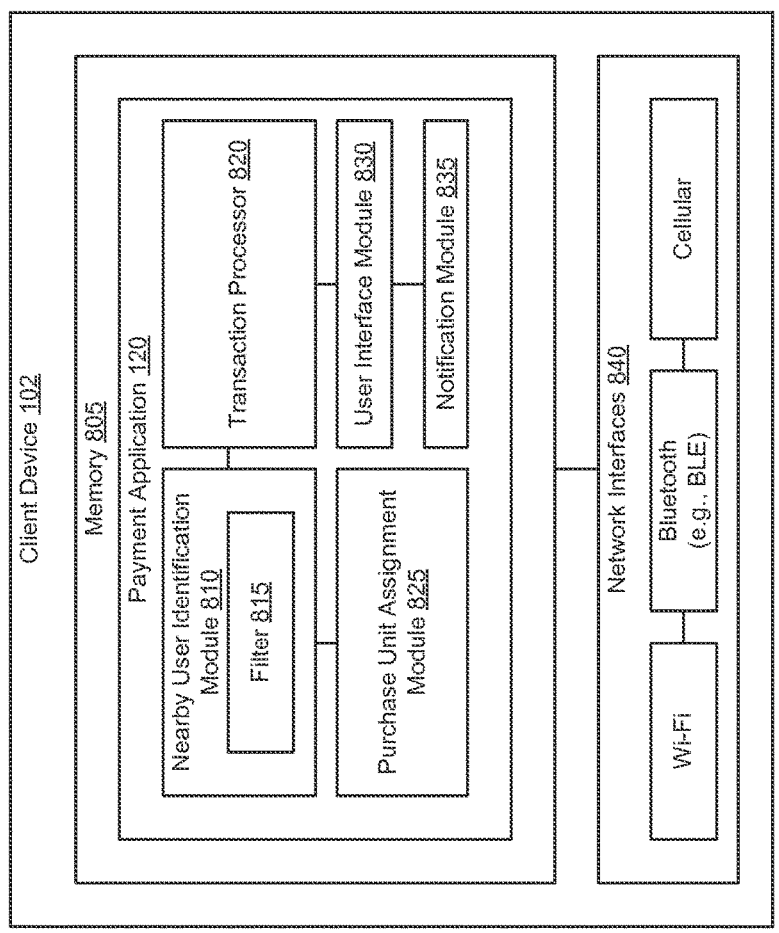
FIG. 8 is a block diagram illustrating example components of a client device implementing the disclosed technologies.

FIG. 8 is a block diagram illustrating example components of a client device implementing the disclosed technologies.

The client device 102 includes a memory 805 for storing instructions associated with multiple modules of the payment application 120 and network interfaces 840, among other components. In some embodiments, the payment application 120 can include a nearby user identification module 810 having a filter 815, a purchase unit assignment module 825, a transaction processor 820, a user interface module 830, and/or a notification module 835. One or more of these components or modules may be optional in some embodiments.

The payment application 120 enables a user to send a payment to or request a payment from another user. The transaction processor 820 receives an amount, an indication of a type of request, and identification of one or more recipients from a user, and based on the type of request specified, generates a message (e.g., an email, a text message, an instant message) based on the received information for the user to send to the payment service system 108 for processing. The nearby user identification module 810, in some embodiments, identifies multiple devices (and thereby individuals or users associated with the devices) that are nearby or in proximity to the client device 102. In some embodiments, the client device 102 can be considered to be nearby or in proximity of another device when the client device 102 has established a connection with the other device using a network interface such as a BLE network interface. A BLE connection can be established when two devices are within a pre-configured range. A typical BLE connection range is 20 meters, but it is possible to extend this range to over 100 meters. In some embodiments, the maximum range for the BLE connection can be set by the payment application 120. Alternatively, the maximum range can be configured by a user (e.g., via the payment application 120 or via the device settings). In some embodiments, the nearby user identification module 810 can consider another device as being near the client device 102 when the two devices are connected to the same wireless (e.g., Wi-Fi) network (e.g., same wireless access point) or the same cellular network. Once a connection with a nearby device has been established, the nearby user identification module 810 can exchange information (e.g., user identifying information) with the nearby device over the established connection. In some embodiments, the nearby user identification module 810 can apply a contact filter 815 to identify a subset of nearby users that are contacts of the user.

The purchase unit assignment module 825 can receive purchase unit information provided by a merchant, and can provide the purchase unit information to the user to enable the user to assign a purchase unit to a receiver selected from a list of users identified by the nearby user identification module or from a list of contacts. In some embodiments, the user can also enter receiver information. When the user submits the assignment data for transfer, the purchase unit assignment module 825 can provide the assignment data from the user to the transaction processor 820 to cause the payment service system 108 to use the assignment data to send a transfer of the purchase unit to the receiver.

The notification module 835 can generally handle generation and display of any incoming and/or outgoing notifications such as push notifications, email, text messages, and/or the like. The user interface module 830 provides various components for building graphical user interfaces of the payment application 120. The network interface 840 can be a networking module that enables the merchant application 110 to transmit and/or receive data in a network with an entity that is external to the client device 102 (e.g., other client devices, the payment service system 108), through any known and/or convenient communications protocol supported client device 102 and the external entity. The network interface 840 can include one or more of a network adaptor card, a wireless network interface card (e.g., SMS interface, Wi-Fi interface, interfaces for various generations of mobile communication standards including but not limited to 1G, 2G, 3G, 3.5G, 4G, LTE, etc.,), Bluetooth (e.g., BLE), a router, an access point, a wireless router, a switch, a multi-layer switch, a protocol converter, a gateway, a bridge, bridge router, a hub, a digital media receiver, and/or a repeater.

Figure 9:
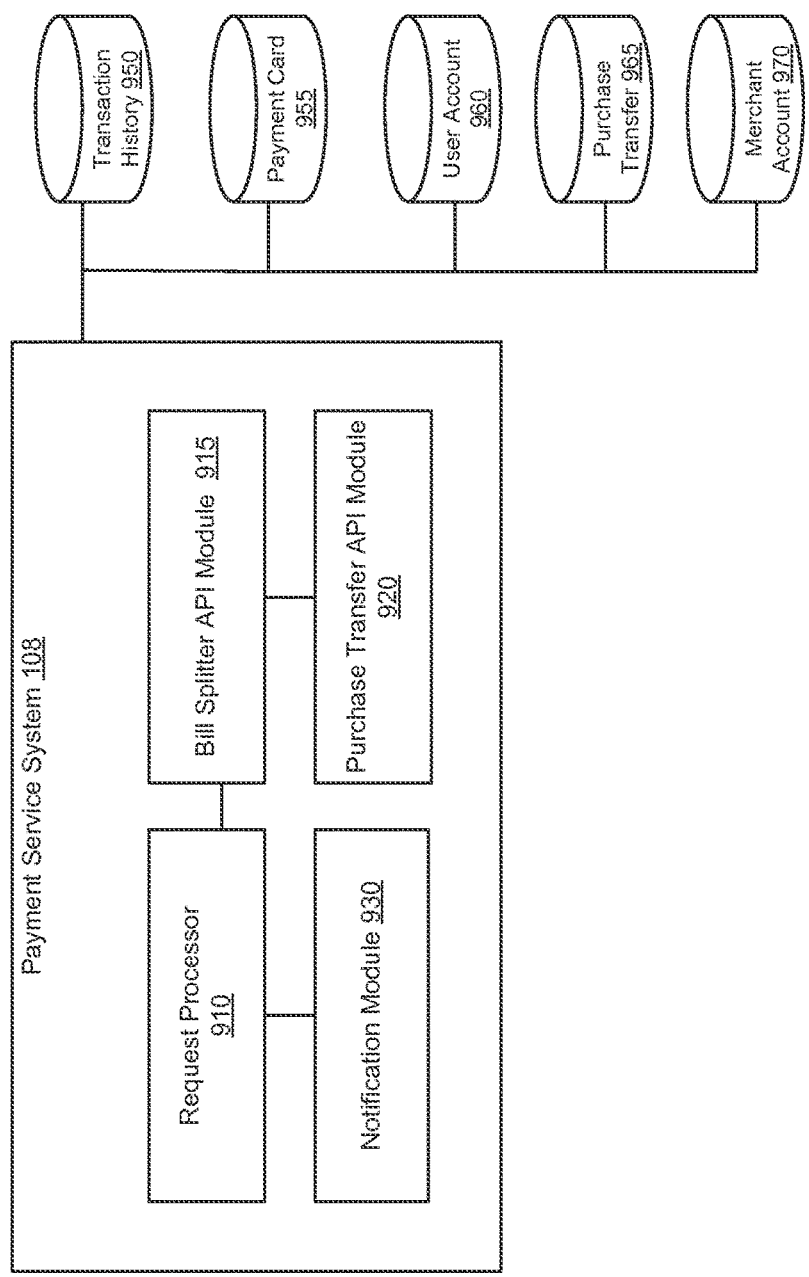
FIG. 9 is a block diagram illustrating example components of a payment service system implementing the disclosed technologies.

FIG. 9 is a block diagram illustrating example components of a payment service system implementing the disclosed technologies.

In some embodiments, the payment service system 108 can include a request processor 910, a bill splitting API module 915, and a purchase transfer API module 920, among other components. One or more of these components can access one or more database tables including a transaction history database table 950, a payment card database table 955, a user account database table 960, a purchase transfer database table 965, and/or a merchant account database table 970 to retrieve data and/or store data.

The bill splitting API module 915 receives a split bill payment request from a merchant application executing on a merchant system. The split bill payment request can include information identifying a merchant associated with merchant system (e.g., merchant identifier), multiple bill payers and each bill payer's portion of the bill. The bill splitting API module 915 provides the information in the request to the request processor 910. The request processor 910, via the notification module 930, sends to a client device of each bill payer, a request or message for payment a respective portion of the bill. The message can be in the form of a push notification, an email, a text message, an instant message or other communication means. The request processor 910 receives a response from each bill payer approving a specified amount for payment of the bill payer's portion of the bill. The request processor 910 then identifies a financial account associated with each bill payer, and a financial account associated with the merchant and communicates with a payment card network (e.g., the payment card network 116 of FIG. 1) to initiate a transfer of the specified amount approved by each bill payer from the bill payer's financial account to the merchant's financial account. In some embodiments, the bill splitting API module 915 can transmit a confirmation of the split bill payment to the merchant application upon initiation or completion of the transfer of funds to the merchant's financial account.

The purchase transfer API module 920 receives purchase unit information from a merchant system associated with a merchant. The purchase unit information is associated with a purchase of multiple units by a user via the merchant system. Each purchase unit has a monetary value associated with it. The purchase transfer API module 920, in some embodiments, can analyze the purchase transfer request to identify the user and transmit the purchase unit information to a payment application on a client device of the identified user. In some embodiments, the purchase transfer API module 920 can also receive purchase unit assignment data from the payment application on the client device. The purchase unit assignment data assigns at least one purchase unit to a receiver for transfer to the receiver. The purchase transfer API module 920 can provide information about the receiver, and the purchase unit to the request processor 910. The request processor 910 then sends a transfer of the purchase unit having a specific monetary value to the receiver and request a response. The request processor 910 can receive a response from the receiver that can indicate that the receiver accepted the transfer or declined the transfer of the purchase unit. If the receiver accepted the transfer of the purchase unit, the request processor 910 causes an amount corresponding to the monetary value of the purchase unit to be transferred from a financial account of the receiver to a financial account of the user. In some embodiments, the purchase transfer API module 920 can transmit information about the transfer of the purchase unit to the receiver to the merchant system.

One or more of these components can access one or more database tables including a transaction history database table 950, a payment card database table 955, a user account database table 960, a purchase transfer database table 965, and/or a merchant account database table 970 to retrieve data and/or store data. The transaction history database table 950 can store data relating to all transactions in association with a user identifier or merchant identifier. The payment card database table 955 can store payment card details such as payment card type, payment card number or hash thereof, security code, expiration date, and/or the like in association with a user identifier. The user account database table 960 can store data relating to users of the payment service system and can include data fields such as, but not limited to: user identifier, username, first name, last name, email address, phone number, alias, device identifier, application identifier, and/or the like. The purchase transfer database table 965 can store data relating to purchase transfer transactions, and can include data fields such as, but not limited to: merchant identifier, purchase unit identifier, purchase unit value, first buyer identifier, second buyer identifier, third buyer identifier, and/or the like. The merchant account database table 970 can store data relating to merchant accounts, and can include data fields such as, but not limited to: merchant identifier, name, address, store identifier, bank account number, bank name, routing number, and/or the like.

Figure 10:
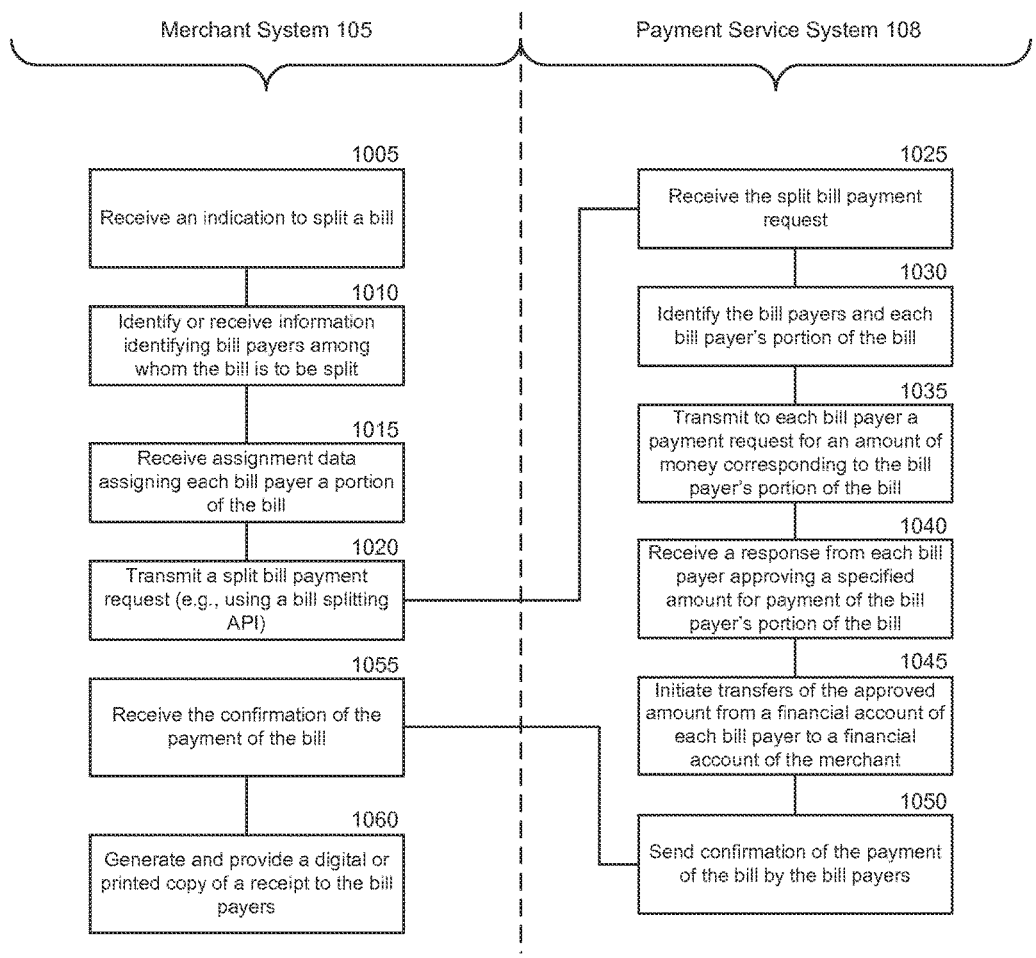
FIG. 10 is a logic flow diagram illustrating an example method of requesting and processing a split bill payment.

FIG. 10 is a logic flow diagram illustrating an example method of requesting and processing a split bill payment.

In some embodiments, at block 1005, a merchant application (e.g., merchant application 110) executing on a merchant system 105 receives an indication to split a bill from a merchant via a user interface of the merchant application 110. At block 1010, the merchant application 110 identifies or receives information identifying bill payers among whom the bill is to be split. In some embodiments, the merchant system 105 can connect to the client devices that are nearby and exchange information with those client devices to identify their users. The connection between the merchant system 105 and the client devices can be over a low energy wireless connection (e.g., BLE connection), over a local Wi-Fi network, over a network 106 using geo-fencing technology, and/or the like. Some or all of the nearby users can be selected as the bill payers. In some embodiments, the merchant can input information about the payers into the merchant application 110. At block 1015, the merchant application 110 receives assignment data that divides the bill among the bill payers such that each bill payer is assigned a portion of the bill. At block 1020, the merchant system 105 receives an instruction to send a split bill payment request, and in response, transmits the request to the payment service system 108 via the bill splitting API. The request can include, but is not limited to: information identifying the merchant and the bill payers, along with each bill payer's portion of the bill.

At block 1025, the payment service system 108 receives the split bill payment request. The payment service system 108 analyzes the request to identify the bill payers and each bill payer's share of the bill at block 1030. The payment service system 108 then transmits to each bill payer a request for payment of the bill payer's share of the bill at block 1035. At block 1040, the payment service system receives a response from each bill payer approving a specific amount for payment of the bill payer's share of the bill. In some embodiments, the specific amount approved by the bill payer can include an additional amount for tax, tips, and/or other surcharges, and can thus be greater than the bill payer's portion of the bill amount that was requested.

At block 1045, the payment service system 108 can initiate a transfer of the amount approved by each bill payer from a financial account associated with the bill payer to a financial account associated with the merchant. At block 1050, the payment service system 108 sends a confirmation of collection of the payment from the bill payers to the merchant system 105. The merchant system 105, at block 1055, receives the confirmation. In some embodiments, at block 1060, the merchant system 105 can generate and provide to each bill payer a digital or printed copy of the bill.

Figure 11:
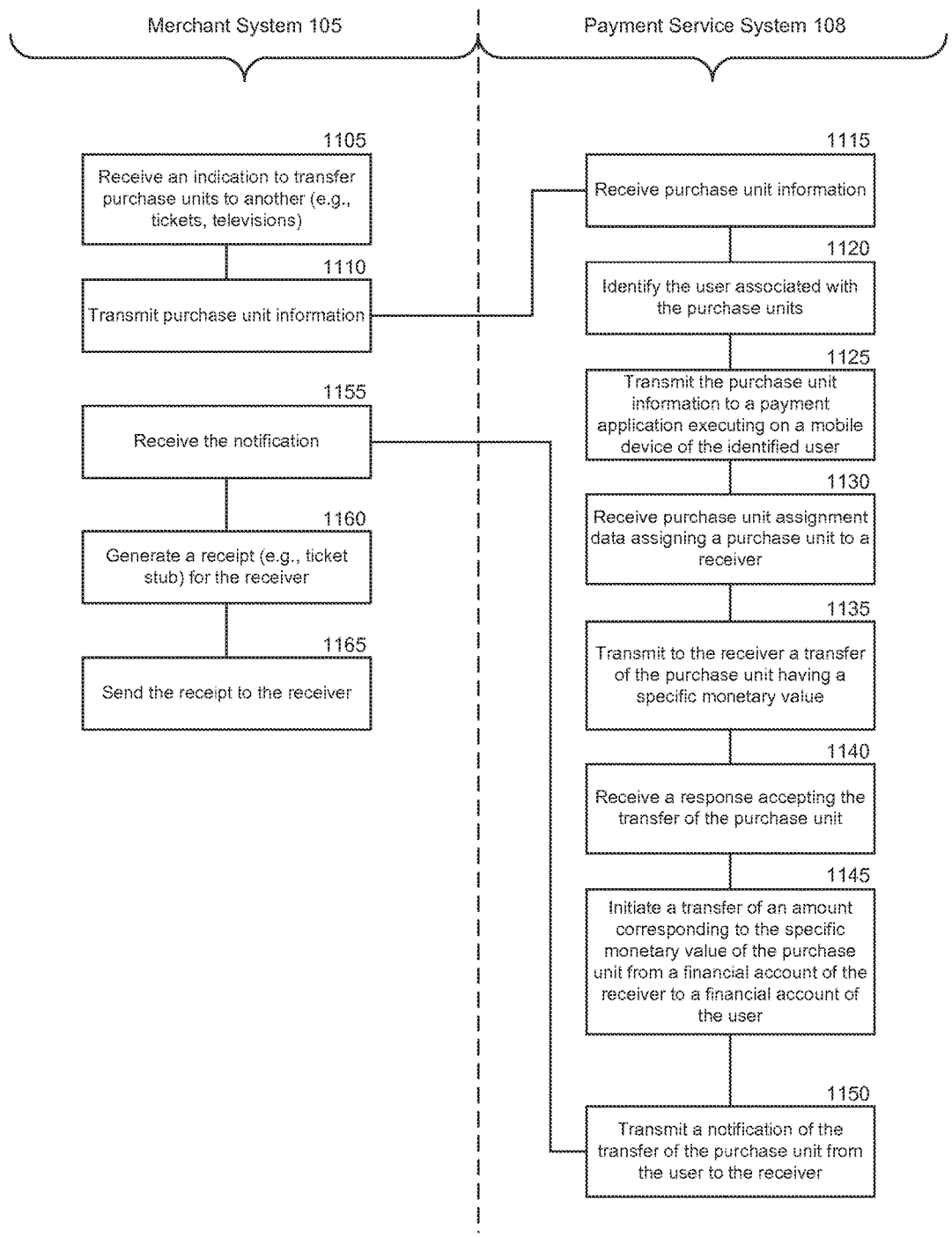
FIG. 11 is a logic flow diagram illustrating an example method of transferring purchase units.

FIG. 11 is a logic flow diagram illustrating an example method of transferring purchase units.

In some embodiments, the merchant system 105 receives an indication from a user to transfer a purchase unit purchased by the user to a receiver at block 1105. In response, at block 1110, the merchant system 105 transmits purchase unit information including information about at least one purchase unit to the payment service system 108. In some embodiments, the transmission of the purchase unit information can occur without receiving any indication from the user. For example, the transmission can be triggered upon submission of the purchase order. In some embodiments, the purchase unit information can be transmitted by the merchant system 105 using a purchase transfer API provided by the payment service system 108. At block 1115, the payment service system 108 receives the purchase unit information. At block 1120, the payment service system 108 identifies the user associated with the purchase transfer from the purchase unit information. At block 1125, the payment service system 108 transmits the purchase unit information to a payment application (e.g., payment application 120) executing on a mobile device of the identified user. The payment application can display the purchase unit information, which enables the user to assign or associate the purchase unit to a receiver selected from a list that can include contacts, and/or nearby users (e.g., users having mobile devices that are connected to the user's mobile device over a BLE connection). At block 1130, the payment service system 108 receives purchase unit assignment data that identifies purchased unit and the assigned receiver.

At block 1135, the payment service system 108 sends a transfer of the purchase unit to the receiver identified in the purchase unit assignment data. The receiver can either accept the transfer or decline the transfer. At block 1140, the payment service system 108 receives a response from the receiver accepting the transfer of the purchase unit. At block 1145, the payment service system 108 initiates a transfer of an amount corresponding to the monetary value of the purchase unit from a financial account associated with the receiver to a financial account associated with the user. At block 1150, the payment service system 108 transmits a notification or confirmation on transfer of the purchase unit from the user to the receiver. At block 1155, the merchant system 105 can receive the confirmation. At block 1160, the merchant system 105 can generate a receipt (e.g., a ticket stub) for the receiver and send the receipt to the receiver at block 1165.

Figure 12:
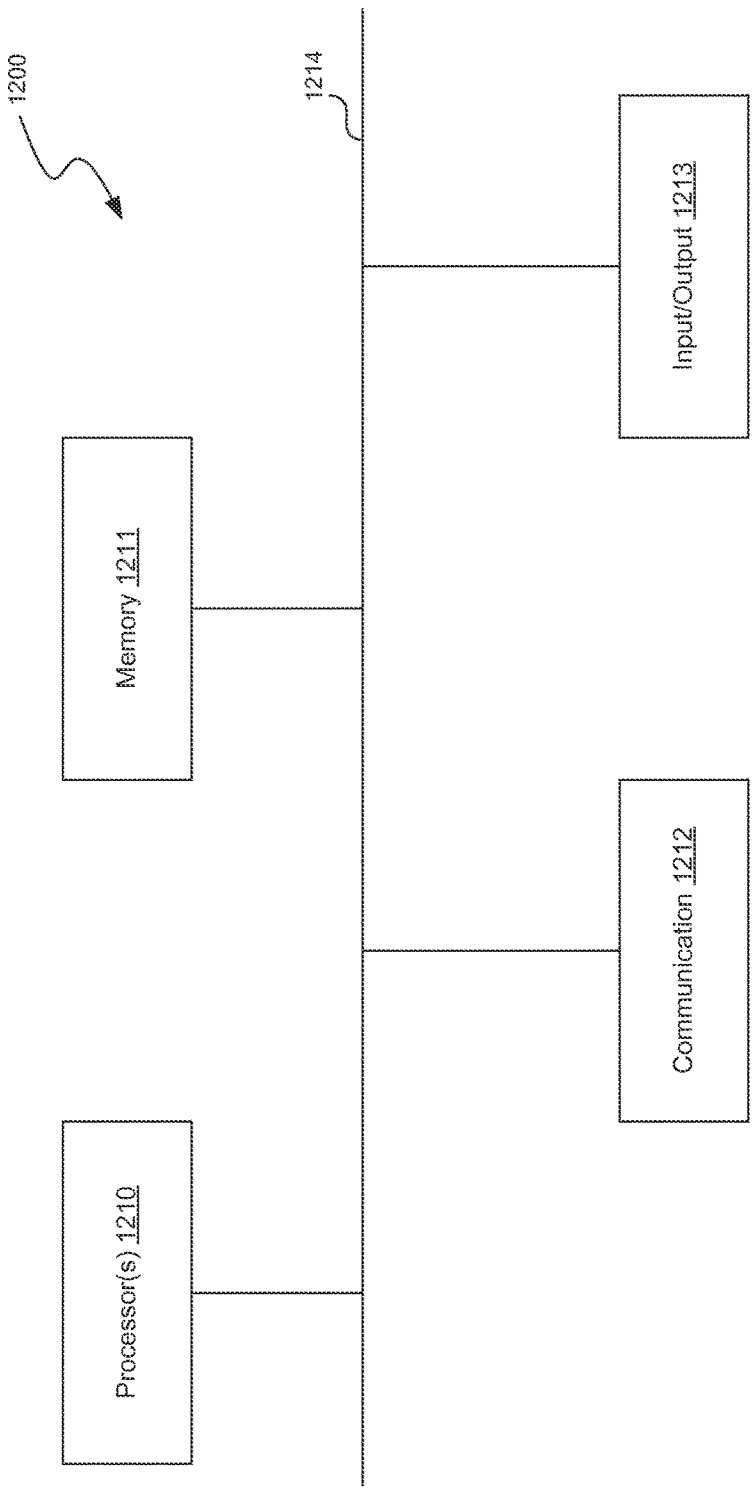
FIG. 12 is a block diagram of an example of a computing system in which at least some operations related to the disclosed technologies can be implemented.

FIG. 12 is a block diagram of an example of a computing system or a processing device 1200 in which at least some operations related to the disclosed technologies can be implemented. The processing device 1200 that can represent any of the devices described above, such as the client devices 102, the financial institutions 118, the merchant system 105, the payment service system 108, and the card payment network 116. As noted above, any of these systems may include two or more processing devices such as represented in FIG. 12, which may be coupled to each other via a network or multiple networks.

In the illustrated embodiment, the processing system 1200 includes one or more processors 1210, memory 1211, a communication device 1212, and one or more input/output (I/O) devices 1213, all coupled to each other through an interconnect 1214. The interconnect 1214 may be or include one or more conductive traces, buses, point-to-point connections, controllers, adapters and/or other conventional connection devices.

The processor(s) 1210 may be or include, for example, one or more general-purpose programmable microprocessors, microcontrollers, application specific integrated circuits (ASICs), programmable gate arrays, or the like, or a combination of such devices. The processor(s) 1210 control the overall operation of the processing device 1200.

Memory 1211 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1211 may store data and instructions that configure the processor(s) 1210 to execute operations in accordance with the embodiments of the technology described above. For example, instructions corresponding to the components of the client device 102 illustrated in FIG. 8 can be stored in the memory 1211. Similarly, the components the payment service system 108 illustrated in FIG. 9 can also be stored in the memory 1211.

The communication device 1212 may be or include, for example, an Ethernet adapter, cable modem, Wi-Fi adapter, cellular transceiver, Bluetooth radio/transceiver (e.g., Bluetooth 4.0 or BLE), or the like, or a combination thereof. Depending on the specific nature and purpose of the processing device 1200, the I/O devices 1213 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The disclosed technology introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the technology introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.).

It will be apparent to those skilled in the art that various modifications and variations can be made in the embodiments of the disclosed technology. For example, the depicted flow charts may be altered in a variety of ways. The order of the steps may be rearranged, steps may be performed in parallel, steps may be omitted, or other steps may be included. As another example, the actual implementation of the database table may take a variety of forms, and the term "database table" is used herein in the generic sense to refer to any area that allows data to be stored in a structured and accessible fashion using such applications or constructs as databases, tables, linked lists, arrays, and so on. Similarly, any and all of the embodiments described above can be combined with each other, except to the extent that it may be stated otherwise above or to the extent that any such embodiments might be mutually exclusive in function and/ or structure. Thus, it is intended that the embodiments of the disclosed technology cover the modifications and variations of the disclosed technology provided they come within the scope of the appended claims and their equivalents.

What is claimed is:

1. A method, comprising:

receiving, by a payment service system, a request to split payment of a bill for a transaction associated with a merchant among multiple bill payers who have shared the transaction with the merchant, the request including information identifying the merchant, one or more mobile devices of the multiple bill payers, and a bill payer's portion of the bill associated with the bill payer's respective mobile device,
  wherein the request is received from a merchant application executing on a point-of-sale system operated by the merchant via a bill splitting application programming interface (API) provided by the payment service system and executing on the point-of-sale system,
  wherein the merchant application is a third-party application that is not associated with the payment service system;
  wherein the merchant has a financial account pre-registered with the payment service system; and
  wherein the merchant application executing on the point-of-sale system detects a plurality of mobile devices within a pre-determined proximity to the point-of-sale system by determining a presence of each of the plurality of mobile devices using signals emitted from the plurality of mobile devices, displays an identifier associated with each mobile device on a user interface associated with the point-of-sale system, and receives a selection of one or more mobile devices of the multiple bill payers from the point-of-sale system;

upon receiving the request to split payment of the bill from the merchant application sending, by the payment service system, a payment request to each of the one or more mobile devices of the multiple bill payers for payment of the respective portions of the bill,
  wherein the payment request causes a payment application executing on a bill payer's mobile device to prompt the bill payer to approve the payment request;

receiving, by the payment service system, a response from the one or more mobile devices of the bill payers,
  wherein the response from a bill payer's mobile device indicates an approval of a specified amount for payment of the bill payer's portion of the bill associated with their respective mobile device;

causing, by the payment service system, a transfer of the specified amount approved by the bill payers from the bill payers' financial accounts to the merchant's financial account; and transmitting, by the payment service system, using the bill splitting API, a confirmation to the merchant application executing on the point-of-sale system indicating the payment of the bill by the one or more mobile devices of the multiple bill payers.

2. The method of claim 1, wherein the plurality of mobile devices are detected by the merchant application based on a Bluetooth Low Energy wireless technology.

3. The method of claim 1, wherein the plurality of mobile devices are detected by the merchant application based on a geo-fencing technology.

4. The method of claim 1, wherein the specified amount approved by the bill payers corresponds to one of: a bill payer's portion of the bill, or the bill payer's portion of the bill and a discretionary tip.

5. A payment service system, comprising:
a server, having a memory, and a processor coupled to the memory, wherein the server comprises:
a component configured to receive a request to split payment of a bill from a merchant system,
wherein a point-of-sale system associated with the merchant system detects one or more mobile devices associated with a plurality of users by determining a presence of the one or more mobile devices using signals emitted from the one or more mobile devices, displays an identifier associated with each mobile device on a user interface associated with the point-of-sale system, and receives a selection of one or more mobile devices from the point-of-sale system;
a component configured to analyze the request to identify:
a merchant associated with the merchant system, each user from the plurality of users associated with the one or more mobile devices, and a portion of the bill associated with each user;
a component configured to:
upon receiving the request to split payment of the bill, send a payment request to the one or more mobile devices of the plurality of users to obtain an approval to use funds to pay for the portion of the bill associated with each user from a financial account associated with each user;
a component configured to receive from the plurality of users a response approving a use of a specified amount of funds from the financial account associated with each user to pay for the portion of the bill associated with each user; and
a component configured to initiate a transfer of the specified amount of funds approved by the plurality of users to a financial account associated with the merchant.

6. The payment service system of claim 5, wherein the request to split payment of the bill is received from a merchant application executing on the merchant system via an application programming interface (API).

7. The payment service system of claim 6, wherein the merchant system is a point-of-sale system and the merchant application is a third-party application that is not associated with the payment service system.

8. The payment service system of claim 7, wherein the server further comprises a component configured to transmit, via the API, a confirmation of the payment of the bill by the plurality of users to the merchant application executing on the merchant system.

9. The payment service system of claim 7, wherein the server further comprises:
a component configured to determine whether the plurality of users have the financial account registered with the payment service system; and
a component configured to send a request to any of the plurality of users without the financial account registered with the payment service to register the financial account with the payment service system.

10. The payment service system of claim 5, wherein the specified amount of funds approved by any of the plurality of the users includes a tip amount in addition to an amount corresponding to the portion of the bill associated with that user.

11. The payment service system of claim 5, wherein the one or more mobile devices of the plurality of users detected in the request to split payment of the bill are connected to the merchant system over a Bluetooth Low Energy wireless connection.

12. The payment service system of claim 5, wherein the one or more mobile devices of the plurality of users detected in the request to split payment of the bill are within a predefined radius of the merchant system and are connected to the merchant system over a Wi-Fi or cellular network.

13. A method, comprising:
receiving, by a merchant application executing on a merchant system, an indication to split a bill among plurality of bill payers,
wherein a point-of-sale system associated with the merchant system detects one or more mobile devices of the plurality of bill payers by determining a presence of the one or more mobile devices associated with the plurality of bill payers using signals emitted from the one or more mobile devices, displays an identifier associated with each mobile device on a user interface associated with the point-of-sale system, and receives a selection of one or more mobile devices from the point-of-sale system;
determining, by the merchant application, a share of the bill associated with each bill payer;
sending, by the merchant application, a split bill payment request to a payment service system, the split bill payment request being sent using an application programming interface (API) provided by the payment service system;
wherein the split bill payment request includes information identifying: the plurality of bill payers, the share of the bill associated with each bill payer, and the merchant;
wherein the split bill payment request causes the payment service system to collect payments corresponding to the share of the bill associated with each bill payer and deposit the collected payments to a financial account associated with the merchant,
wherein the payment service system sends a payment request to the detected one or more mobile device in response to receiving the split bill payment request from the merchant application; and
receiving, by the merchant application via the API, a confirmation of the deposit of the payments corresponding to the share of the bill associated with each bill payer into the financial account associated with the merchant.

14. The method of claim 13, further comprising:
generating, by the merchant application, a receipt for the plurality of bill payers for the payment of the share of the bill associated with each bill payer.

15. The method of claim 13, further comprising:
identifying, by the merchant application, multiple users having mobile devices that are nearby the merchant system; and
selecting, by the merchant application, some of the nearby users as the plurality of bill payers for sharing the bill.

16. The method of claim 15, wherein the merchant system connects to the mobile devices of the multiple users that are nearby over a Bluetooth Low Energy wireless technology.

17. The method of claim 15, wherein the merchant system connects to the mobile devices that are within a predefined range of the merchant system over a wireless network that includes a Wi-Fi network or a cellular network.

18. The method of claim 13, wherein determining the share of the bill associated with each bill payer includes:
   splitting the bill equally among each bill payer of the plurality of bill payers.

19. The method of claim 13, wherein determining the share of the bill associated with each bill payer includes:
   receiving assignment information that assigns items on the bill to the plurality of bill payers; and
   determining the share of the bill associated with each bill payer based on the assignment information.

20. The method of claim 13, wherein collecting the payments corresponding to the share of the bill associated with each bill payer includes sending a notification to a mobile devices associated with each bill payer and receiving a confirmation from the plurality of bill payers to use funds for the payments corresponding to the share of the bill associated with each bill payer.

* * * * *